US009424556B2

(12) United States Patent
Ollila et al.

(10) Patent No.: US 9,424,556 B2
(45) Date of Patent: Aug. 23, 2016

(54) METHOD AND APPARATUS FOR LINKING MULTIPLE CONTACT IDENTIFIERS OF AN INDIVIDUAL

(75) Inventors: Elina Maria Inkeri Ollila, Helsinki (FI); Mikko Johannes Honkala, Helsinki (FI); Yan Qing Cui, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1364 days.

(21) Appl. No.: 12/904,605

(22) Filed: Oct. 14, 2010

(65) Prior Publication Data
US 2012/0096523 A1    Apr. 19, 2012

(51) Int. Cl.
*G06Q 10/10*         (2012.01)
(52) U.S. Cl.
CPC ............ *G06Q 10/107* (2013.01); *G06Q 10/10* (2013.01)
(58) Field of Classification Search
None
See application file for complete search history.

(56) References Cited

U.S. PATENT DOCUMENTS

| | | | |
|---|---|---|---|
| 7,528,729 | B2 | 5/2009 | Light et al. |
| 2005/0216550 | A1 | 9/2005 | Paseman et al. |
| 2006/0224675 | A1 | 10/2006 | Fox et al. |
| 2007/0282987 | A1* | 12/2007 | Fischer et al. ............... 709/223 |
| 2007/0295797 | A1 | 12/2007 | Herman et al. |
| 2008/0292080 | A1 | 11/2008 | Quon et al. |
| 2008/0316925 | A1 | 12/2008 | Dolin et al. |
| 2009/0044252 | A1* | 2/2009 | Kashima et al. ............... 726/3 |

(Continued)

FOREIGN PATENT DOCUMENTS

| | | |
|---|---|---|
| EP | 2 184 909 A1 | 5/2010 |
| EP | 2 192 535 A1 | 6/2010 |

(Continued)

OTHER PUBLICATIONS

International Search Report for PCT Application No. PCT/FI2011/050871 dated Feb. 1, 2012, pp. 1-6.

(Continued)

*Primary Examiner* — Kaveh Abrishamkar
(74) *Attorney, Agent, or Firm* — Ditthavong & Steiner, P.C.

(57) ABSTRACT

Techniques for linking multiple contact identifiers of an individual include receiving first data that indicates contacts of a first user at first services. Contact identifiers for a different second user at second services are determined based at least in part on the contacts. Second data that indicates an association among the second user and the candidate contact identifiers is sent to the first user. In some embodiments on a client, techniques include determining to send first data that indicates contacts of a first user at first services; and receiving second data. The second data indicates an association among a different second user and candidate contact identifiers for the second user at second services based at least in part on the contacts. A prompt is presented for the first user to approve an association between the second user and a candidate contact identifier.

20 Claims, 12 Drawing Sheets

(56) References Cited

U.S. PATENT DOCUMENTS

| | | |
|---|---|---|
| 2009/0192996 A1 | 7/2009 | Guo et al. |
| 2010/0077048 A1 | 3/2010 | Czyzewicz et al. |
| 2010/0262916 A1 | 10/2010 | Jones et al. |
| 2010/0274815 A1 | 10/2010 | Vanasco |
| 2011/0055234 A1 | 3/2011 | Miettinen |
| 2011/0078184 A1 | 3/2011 | Song et al. |
| 2011/0078190 A1 | 3/2011 | Samuel et al. |
| 2011/0167114 A1 | 7/2011 | Blanchard, III et al. |

FOREIGN PATENT DOCUMENTS

| | | |
|---|---|---|
| WO | WO 2009/002658 A1 | 12/2008 |
| WO | WO 2009/079609 A2 | 6/2009 |
| WO | WO 2010/024992 A1 | 3/2010 |
| WO | WO 2010/077526 A2 | 7/2010 |

OTHER PUBLICATIONS

Suggested Merge and Organizing All of Your Contacts—Gist Power Tip. Video [online], YouTube, Jun. 22, 2010, URL: http://www.youtube.com/watch?v=GJhQy_6sITM, screen captures pp. 1-2.

Written Opinion for PCT Application No. PCT/FI2011/050871 dated Feb. 1, 2012, pp. 1-10.

Real time visualization of matched taxpayer identities and social networks, accessed on: Nov. 29, 2010, ftp://service.boulder.ibm.com/software/data/mdm/pdf/Visualization-of-Matched-Taxpayers.pdf, pp. 1-4.

* cited by examiner

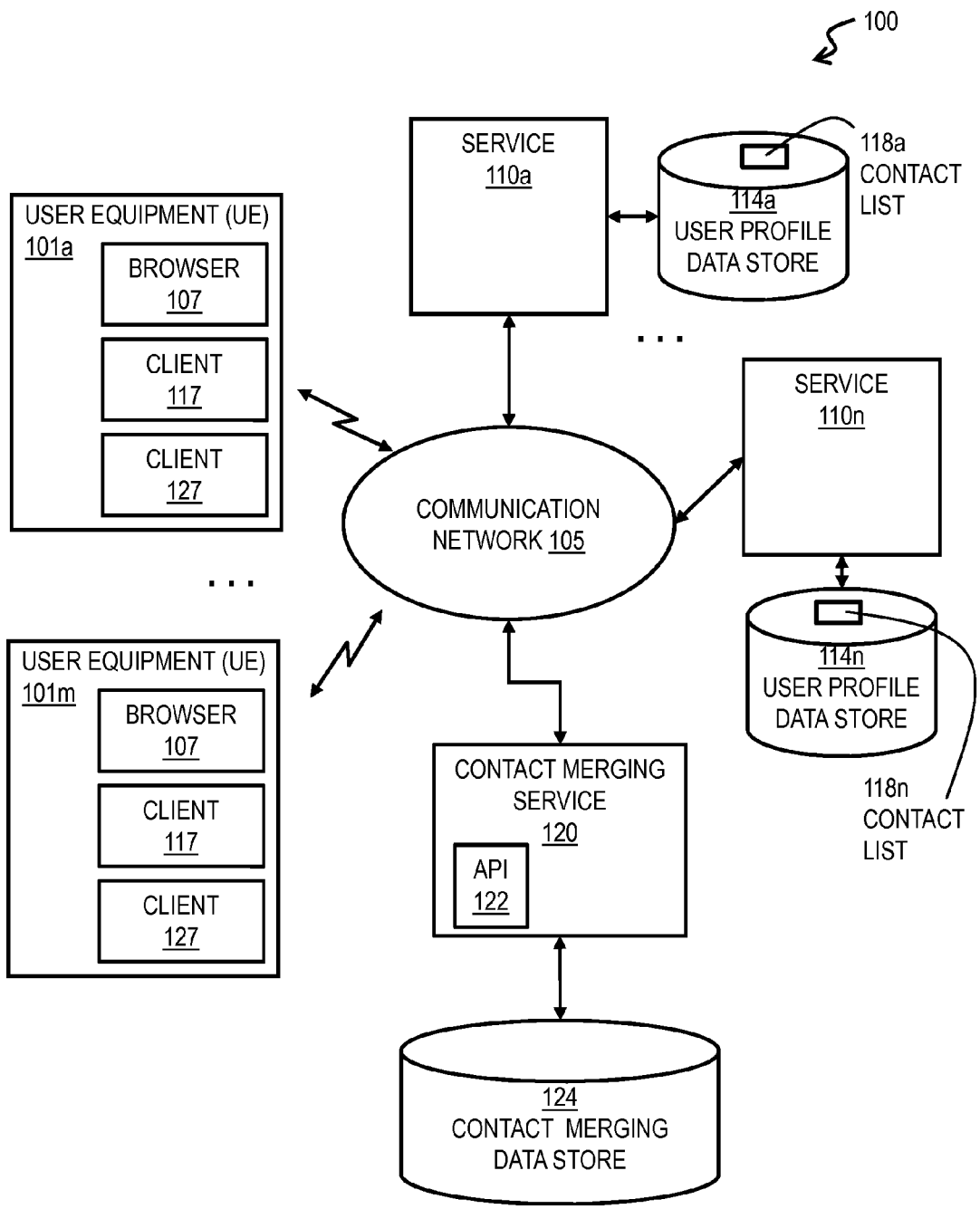

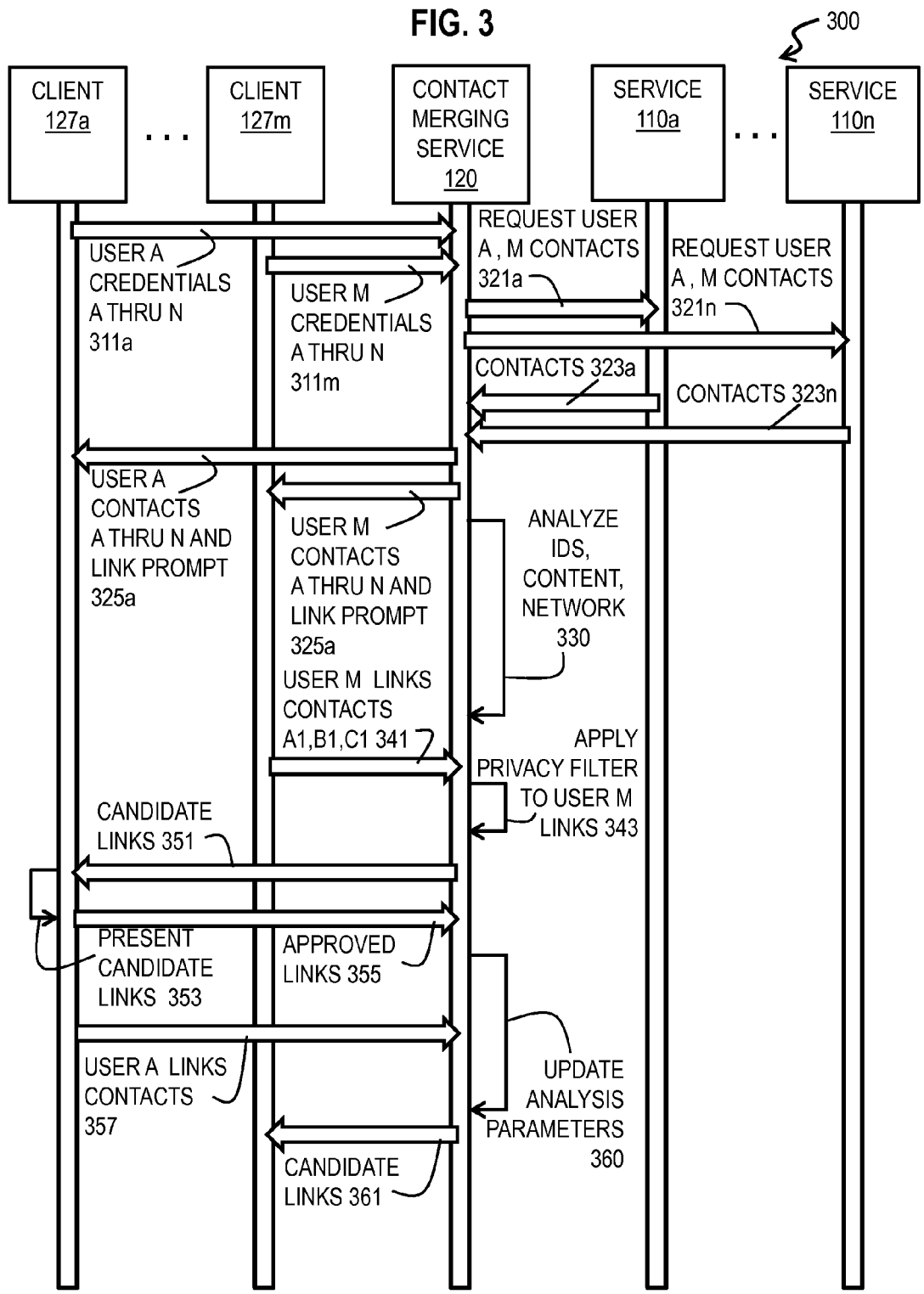

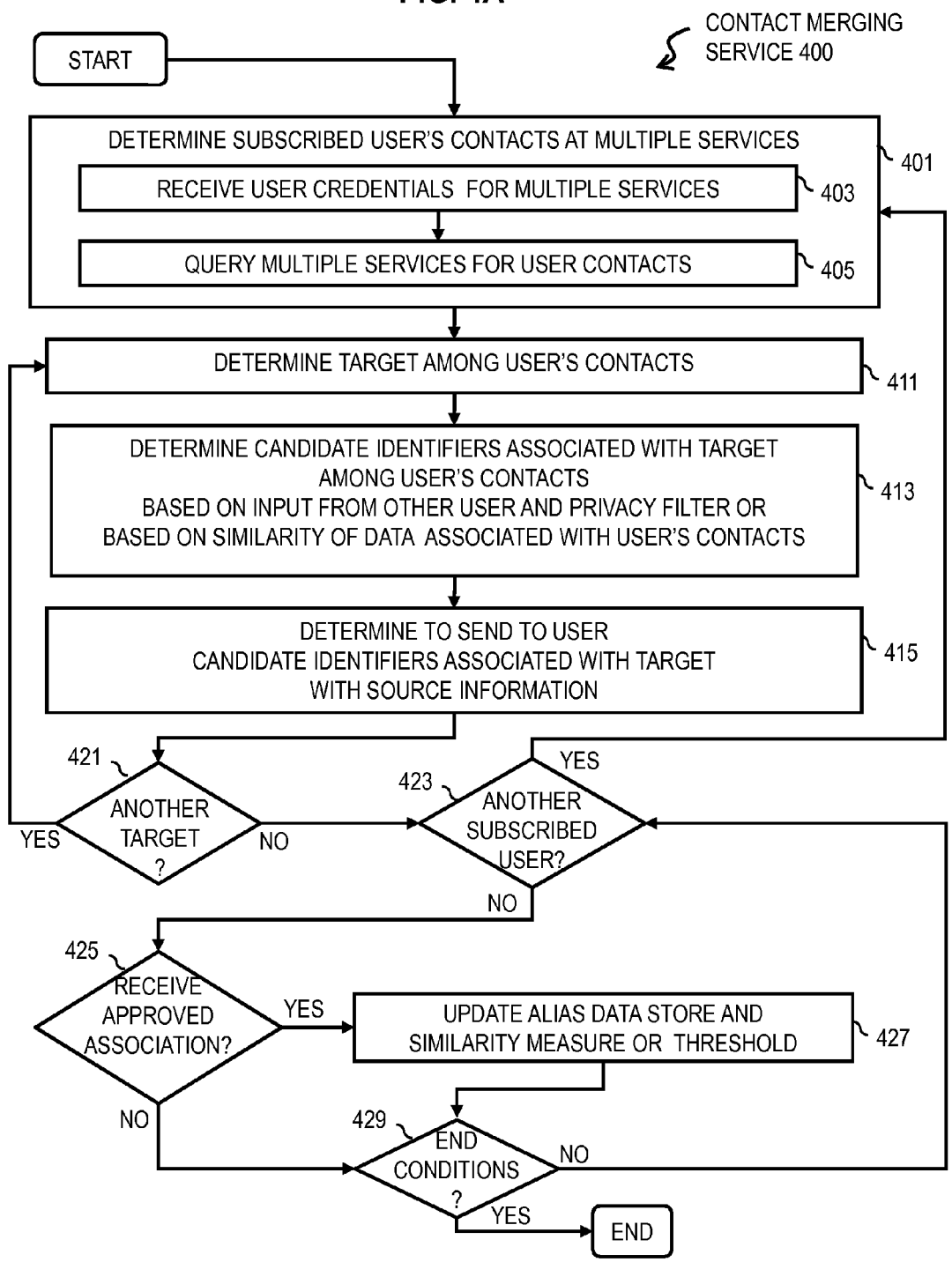

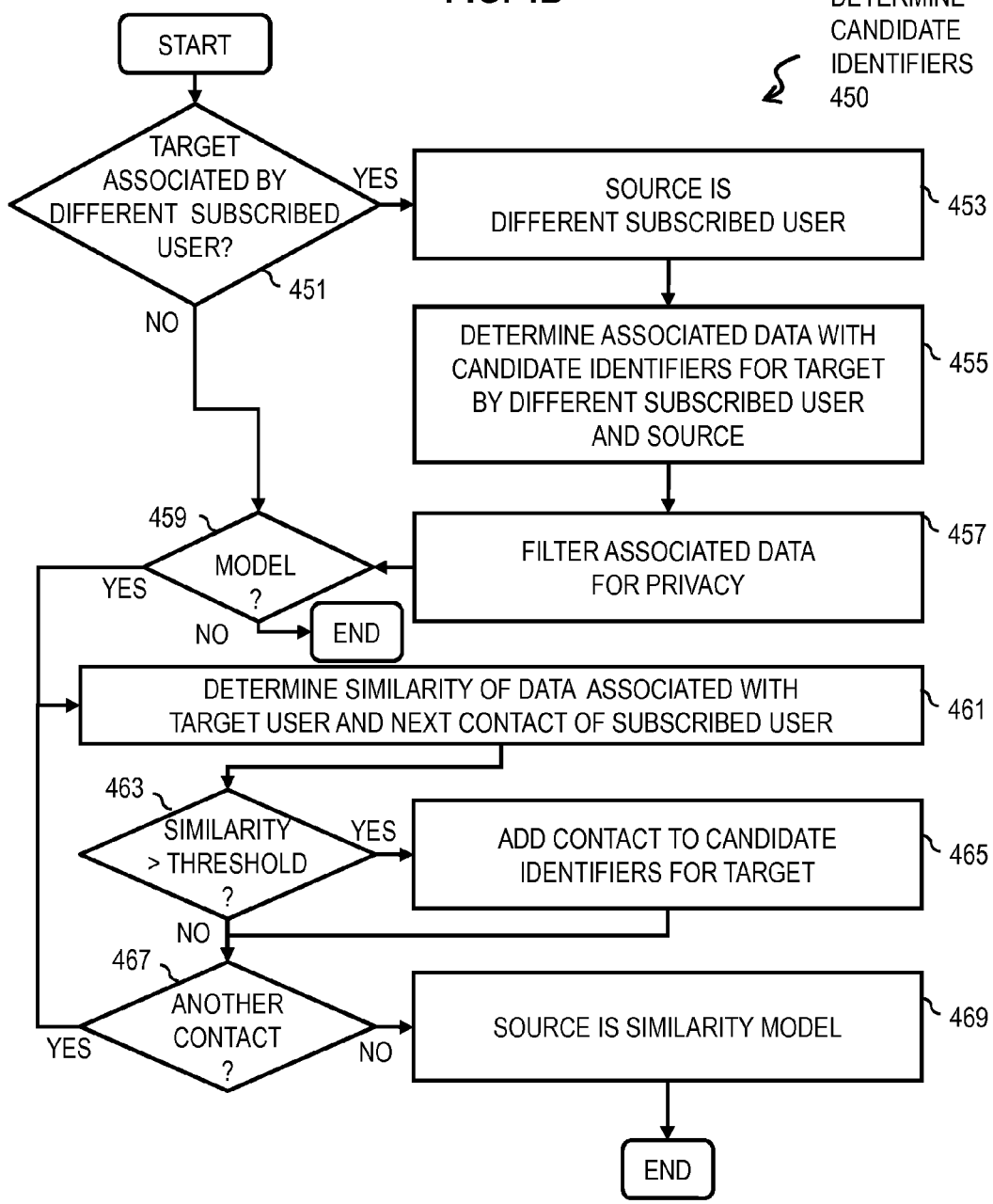

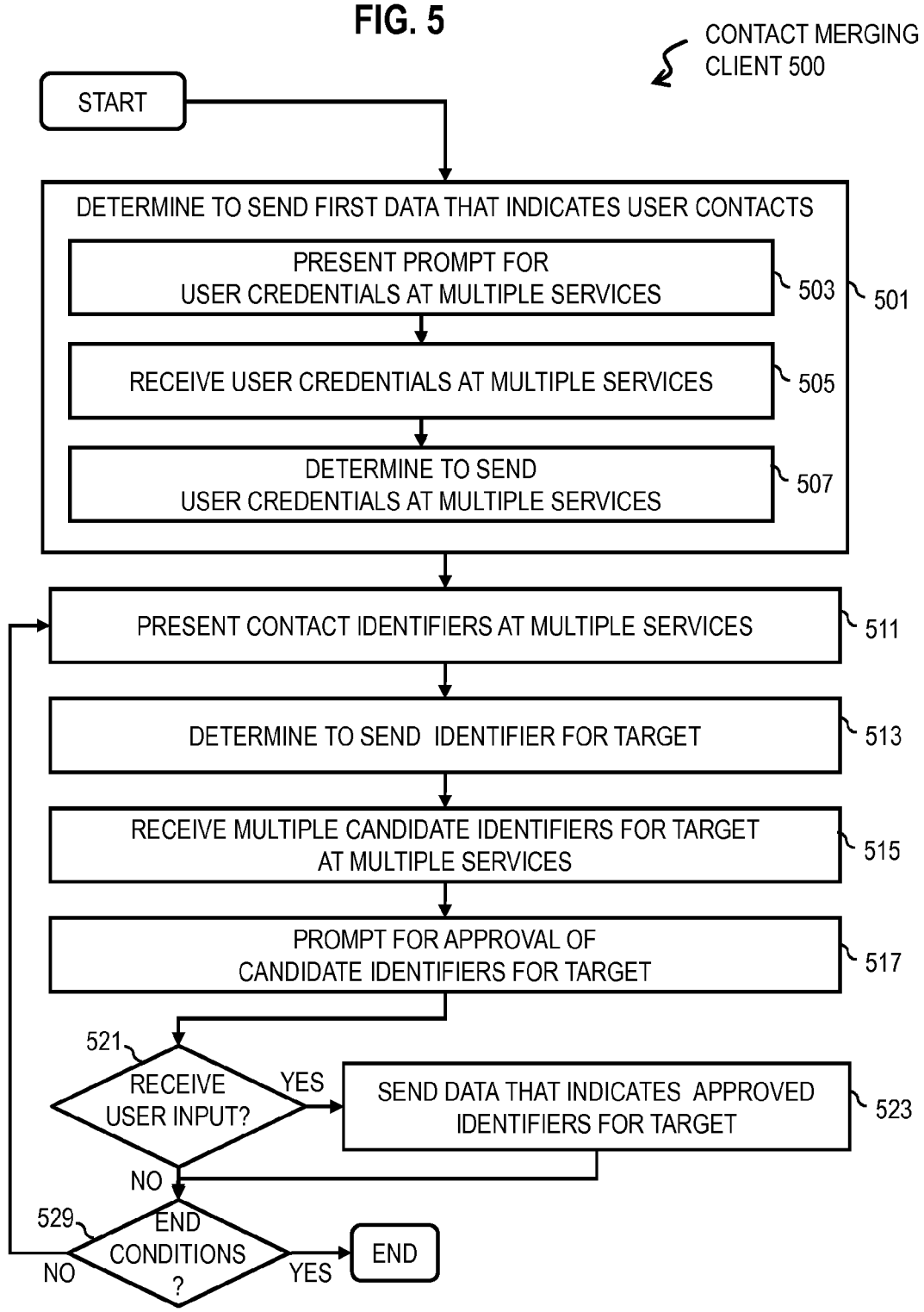

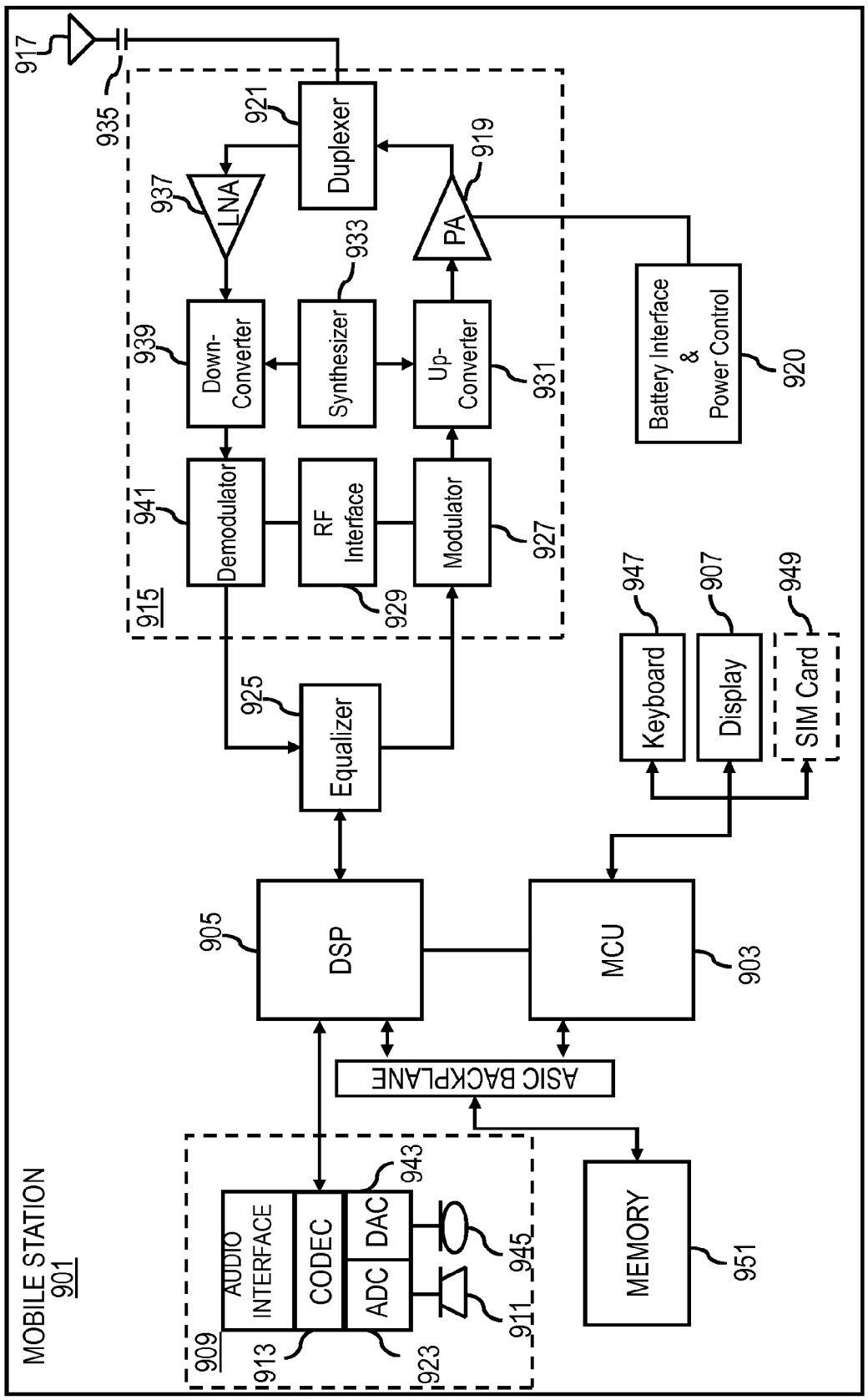

METHOD AND APPARATUS FOR LINKING MULTIPLE CONTACT IDENTIFIERS OF AN INDIVIDUAL

BACKGROUND

Service providers and device manufacturers (e.g., wireless, cellular, etc.) are continually challenged to deliver value and convenience to consumers by, for example, providing compelling network services. In many popular network services, such as email, Short Message Service (SMS) messaging (also called text messaging) and social networks with various posting strategies, a user communicates with other users of those services, who are called contacts of the user. Typically each such service invites a user registering for the service to identify himself or herself with a user name for all future interactions with the service so that messages by and for each user can be properly directed. If a chosen user name is not available, the user is invited to generate a new name. As the number of available network services proliferates, and users register for several of them, multiple user names are adopted by the same individual entity (whether an organization or person). Consequently the same entity can appear with different identifiers on several contact lists of a user on several network services. It becomes a burden for the user to link the multiple different identifiers of one entity on several different contact lists for different network services. Thus, it becomes tedious, time consuming and otherwise difficult to perform several network functions, such as directing a post to one individual on all available services, or recognize or otherwise coordinate the information (such as status posts and profile information like age, interests, music tastes, location) received from different identifiers that represent the same individual entity on different services.

SOME EXAMPLE EMBODIMENTS

Therefore, there is a need for an approach for linking multiple contact identifiers of an individual.

According to one embodiment, a method comprises receiving first data that indicates a plurality of contacts of a first user at a first plurality of services. The method also comprises determining a plurality of candidate contact identifiers for a different second user at a second plurality of services based at least in part on contacts of the first user at the first plurality of services. The method further comprises determining to send second data that indicates an association among the second user and the plurality of candidate contact identifiers.

According to another embodiment, a method comprises determining to send first data that indicates a plurality of contacts of a first user at a first plurality of services. The method also comprises receiving second data that indicates an association among a different second user and a plurality of candidate contact identifiers for the second user at a second plurality of services based at least in part on contacts of the first user at the first plurality of service. The method further comprises determining to present a prompt for the first user to approve an association between the second user and one or more of the candidate contact identifiers.

According to another embodiment, a method comprises facilitating access to at least one interface configured to allow access to at least one service, the at least one service configured to perform at least the steps of at least one of the above methods.

According to another embodiment, an apparatus comprises at least one processor, and at least one memory including computer program code, the at least one memory and the computer program code configured to, with the at least one processor, cause, at least in part, the apparatus to perform the steps of at least one of the above methods.

According to another embodiment, a computer-readable storage medium carries one or more sequences of one or more instructions which, when executed by one or more processors, cause, at least in part, an apparatus to perform the steps of at least one of the above methods.

According to another embodiment, a computer program product includes one or more sequences of one or more instructions which, when executed by one or more processors, cause an apparatus to at least perform the steps of at least one of the above methods.

According to another embodiment, an apparatus comprises means for performing each step of at least one of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of linking multiple contact identifiers (aliases) of an individual, according to one embodiment;

FIG. 3 is a time-sequence diagram of messages exchanged with a contact merging service for linking multiple contact identifiers of an individual, according to an embodiment;

FIG. 4A is a flow chart of a process at a contact merging service, according to an embodiment;

FIG. 4B is a flow chart of a step of the process of FIG. 4A, according to an embodiment;

FIG. 5 is a flowchart of a process at a contact merging client for linking multiple contact identifiers of an individual, according to one embodiment;

FIG. 9 is a diagram of a mobile terminal (e.g., handset) that can be used to implement an embodiment of the invention.

DESCRIPTION OF SOME EMBODIMENTS

Figure 2A:
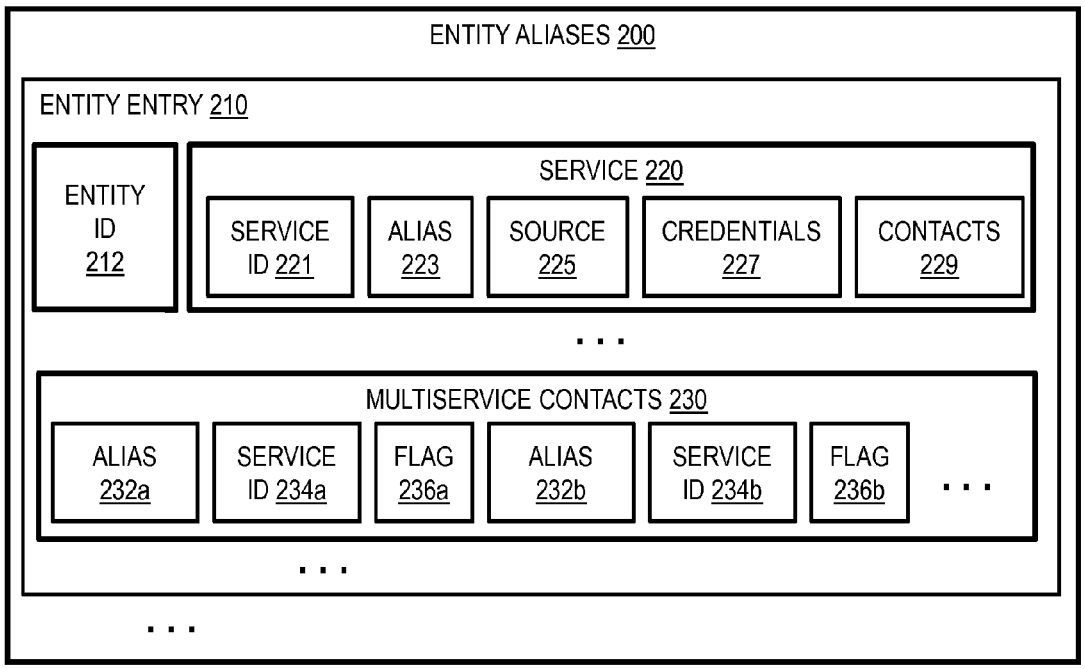
FIG. 2A is a diagram of a data structure for storing aliases of each entity, according to one embodiment.

Examples of a method, apparatus, and computer program are disclosed for linking multiple contact identifiers of an individual. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term user refers to an entity that uses a network service through a communications network, where an entity can be a person or an organization. A contact refers to a different user of the service with whom the user communicates through the service and whose identifier is stored in a user profile data structure maintained by the service for the user. Thus a contact is a second user who is associated with the first user through the corresponding service. Not every user is a contact of the contact. For example, while Bob may be a contact of Alice, because Bob's identifier is stored in Alice's profile for a particular service; Alice might not be a contact of Bob because her identifier is not stored in Bob's profile for the particular service. The term aliases refers to multiple different contact identifiers for the same entity at one or more network services; an alias refers to one of the aliases. Although various embodiments are described with respect to social network services accessed through a mobile terminal, it is contemplated that the approach described herein may be used with other network services and user equipment. Furthermore, while example embodiments are described in which multiple contact identifiers are linked in a corresponding number of network services, in some embodiments, two or more contact identifiers are linked in the same service (e.g., Bob may have two accounts in the same network service); and such linkages are also found using some embodiments of these techniques.

FIG. 1 is a diagram of a system capable of linking multiple contact identifiers (aliases) of an individual, according to one embodiment. A number M of users, called users A through user M for convenience, employ user equipment (UE) 101a through 101m, respectively, to each access a possibly different one or more of a number N of network services 110a through 110n via communication network 105. If it is assumed for purposes of illustration that each of the M users of UE 101a through 101m registers as one user of each service 110a through 110n, then there are up to N user identifiers for each of M users, for a total of up to N*M unique user identifiers (IDs). Of course, the same user ID can be used in different services, so the total number of unique user IDs is expected to be less than the product N*M. Sometimes the same entity will register for the same service under two different identities, e.g., personal and professional, again affecting the total number of identities. In any case, while user A may know user B has ID C2 in service C, user A may not know the ID of user B in service D, or even that user B is a user of service D. User A would like to know that user B is not only user ID=C2 in service C but also user ID=D3 in service D. To use example names and usernames, Alice would like to know that Bob is not only user ID=ROBERTFLIES234 in FACEBOOK™ but also user ID=FLYBOB789 in FLICKR™. Furthermore, even if Alice does know IDs in other services for many of her contacts, matching all the aliases she knows for her contacts, e.g. 400 contacts, would be tedious, time consuming and error prone. In many cases, the user may not do the linking, and that can undermine some features of one or more services, such as relevance calculation for posts of a certain user.

To address this problem, a system 100 of FIG. 1 introduces the capability to link multiple contact identifiers of an individual. Each network service 110a through 110n (collectively called services 110, hereinafter) maintains a user profile data store 114a through 114n, respectively (collectively called user profiles 114, hereinafter) with records for each user of the corresponding service. The user profiles 114a through 114n include contact list fields 118a through 118n, respectively (collectively called contact list fields 118). Each contact list 118 associates each user with one or more contacts, with each contact identified by a corresponding contact identifier (ID). It is assumed in the following, for purposes of illustration, that the contact ID for an entity is the same as the user ID for that entity; but in some embodiments, the user ID and contact ID of one entity in one service are different.

The user profile data store 114 for each service provides storage for data that indicates information about each user, such as the user identifier (such as number, actual name, a user name, or an alternative name, if any, to use as a contact ID), a billing method, one or more addresses (such as a postal address, one or more phone numbers, an electronic mail address), an icon or avatar to represent the user, an age, gender, political or religious persuasion, tastes in media (such as music, videos, books), among other information of value for providing the service 110. The contact list 118 holds data that indicates identifiers of zero or more contacts with whom the user communicates through the service 110. One service may have no information about the user profile or user ID or contacts list of the same user on a different service. For example, service 110a has no information about the contents of the user profile data store 114n, including the user ID, or contact list 118n of the same user on service 110n.

Each user equipment (UE) 101 includes one or more client processes, such as a World Wide Web browser 107 described below to present Web pages provided by one or more services 110 (e.g., service 110a through 110g), or one or more application clients 117 that are configured for interacting with one or more corresponding services 110 (e.g., services 110h through 110n).

According to an illustrated embodiment, the system 100 includes a contact merging service 120 that links two or more contact identifiers in one or more contacts lists 118 on a corresponding one more services 110 for a user who subscribes to the service 120 (e.g., user of UE 101a). In some embodiments, the linkage is presented as suggestions to a user to approve. In some embodiments, when confidence in a linkage is sufficiently high, the linkage is automatically treated as if approved. In the illustrated embodiment, the links are stored in a contact merging data store 124. In various embodiments, the service 120 communicates with the user device, e.g., UE 101a, through the browser 107 or a special contact merging client process 127 on the UE 101a, or on other UE, e.g., client process 127 on UE 101m. In some embodiments, the client process 127 or one or more services 110 access the functions of the contact merging service 120 though an application programming interface (API) 122.

Although fields and data stores and devices and processes (such as services and clients) are depicted as integral blocks in a particular arrangement in the illustrated embodiment depicted in FIG. 1 and subsequent drawings FIG. 2 and FIG. 3, in other embodiments, one or more fields, data stores, device and processes, or portions thereof, are arranged in a different order in the same or different or different number of devices or data structures or databases, or are omitted, or one or more additional fields, data stores, devices and processes are added, or the system is changed in come combination of ways. For example, in some embodiments, one or more of the contact lists 118 are not integral blocks but a portion of each is associated with other user profile information in different user records of the user profiles data store 114. In some embodiments, all or part of the contact list 118 is stored in the UE 101. In some embodiments, the client 127 is not a separate process as shown but is a module within browser 107 or application client 117. It is contemplated that the functions of these processes may be combined or separated in one or more processes or performed by other processes of equivalent functionality.

As shown in FIG. 1, the system 100 comprises user equipment (UE) 101 having connectivity to network services 110 and contact merging service 120 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, network services 110 and contact merging service 120 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Processes executing on various devices, often communicate using the client-server model of network communications, widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" and "service" refer to the processes, rather than the hosts, unless otherwise clear from the context. In addition, the process performed by a server can be broken up to run as multiple processes on multiple hosts (sometimes called tiers) for reasons that include reliability, scalability, and redundancy, among others. A well known client process available on most devices (called nodes) connected to a communications network is a World Wide Web client (called a "web browser," or simply "browser") that interacts through messages formatted according to the hypertext transfer protocol (HTTP) with any of a large number of servers called World Wide Web (WWW) servers that provide web pages. As depicted in FIG. 1, the UEs 101 include browsers 107.

Figure 2B:
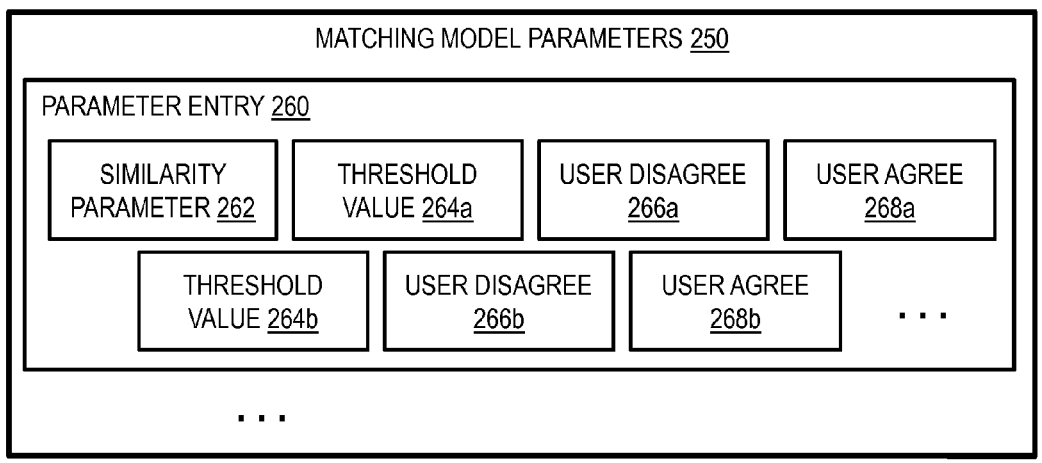
FIG. 2B is a diagram of a data structure for parameters of a matching model, according to one embodiment.

FIG. 2A is a diagram of a data structure 200 for storing aliases of each entity, according to one embodiment. Entity aliases data structure 200 is included in contact merging data store 124 depicted in FIG. 1. Although data structures and fields are depicted in FIG. 2A and FIG. 2B as integral blocks in a particular arrangement for purposes of illustration, in other embodiments, the data structure or fields or portions thereof are arranged in a different order on one or more data structures or databases on one or more devices connected to the network 105, or one or more are omitted, or the data structure is changed in some combination of ways.

The entity aliases data structure 200 includes an entity entry field 210 for each entity learned by the service 120, as indicated by entity entry field 210 and ellipsis. Recall that an entity is a person or organization that has registered as a user with one or more of the network services 110. Each entity entry field 210 includes an entity identifier (ID) field 212, a service field 220 for each service with which the entity has registered, and a multiservice contacts field 230 for each contact of the user who has multiple identifiers. The entity ID field 212 holds data that uniquely indicates an entity at the service 120, such as a sequential number assigned as entity entries 210 are added to the data structure, or a user ID, as learned by the service 120, in a particular one of the services 110, such as the most popular service 110, with sequential numbers used for entities that are not part of that particular service. For purposes of illustration, it is assumed that Alice registers with the contact merging service 120 and is given entity ID=1001. Any user who registers with the contact merging service 120 is called a subscribed user hereinafter, to distinguish from users of network services 110 who do not register with the service 120.

The service field 220 holds data that indicates the alias for the entity at one of the services 110. A separate service field 220 is included for each service discovered for the entity, as indicated by ellipsis. Services with which a particular entity has registered are discovered using one or more of the methods described in more detail below with reference to FIG. 3, FIG. 4A and FIG. 4B. In the illustrated embodiment, the service field 220 includes two or more of a service identifier (ID) field 221, an entity alias field 223, a source field 225, a credentials field 227 and a contacts field 229. In some embodiments, the service field 220 also includes a privacy flag field as described below for a multiservice contacts field 230.

The service ID field 221 holds data that indicates a particular service, such as FACEBOOK™ or FLICKR™. Any method may be used to indicate the service, such as a name, a universal resource indicator (URI) string, or a pointer to a table that includes such information. For purposes of illustration, it is assumed that while registering with service 120, Alice has indicated that she registered with service 110a; and, thus, service ID field 221 holds data indicating SERVICEA.

The entity alias field 223 holds data that indicates an identifier for the entity indicated in field 212 as registered at the service indicated in field 221. For purposes of illustration, it is assumed that while registering with service 120, Alice has indicated that she registered with service 110a using the user ID=ALICE123; and, thus, alias field 223 holds data indicating ALICE123.

The source field 225 holds data that indicates the source of the information in fields 221 and 223. It is assumed for purposes of illustration that valid values for field 225 include data indicating SELF if the information is provided by the entity indicated in field 212. A value of SELF is equivalent to a publisher provided alias. Other valid values for source field 225 include OTHER if the information is provided by a different subscribing user; and MODEL if the information is inferred by a matching model based on data associated with the alias. A value of OTHER is equivalent to a reader provided alias. In some embodiments, the source field holds data indicating other valid values, such as READER rather than OTHER. For example, in some embodiments, MODEL is replaced by one of three other valid values: STRING or CONTENT or RELATIONS. STRING indicates that the alias in field 223 is inferred by the matching model based on the string of characters that make up the alias; CONTENT indicates that the alias in field 223 is inferred by the matching model based on content of communications posted on the service by the alias; and, RELATIONS indicates that the alias in field 223 is inferred by the matching model based on social relationships, such as similarity of networks of contacts of users in different services, as described in more detail below with reference to FIG. 4C. In some embodiments, the source field 225 holds data that indicates a confidence level, e.g., 100% for a self (publisher) provided alias, and somewhat less depending on the input from one or more readers or a similarity measure in the matching model, or some combination. In some embodiments, if reader supplied, the source field 225 also holds data that indicates which other subscribing user added the alias to the entity entry 210. In the illustrated example, because Alice provided the alias, field 225 holds data indicating SELF. The source field is an example means of achieving the advantage of indicating confidence that a suggested alias is correct for the entity of interest.

The credentials field 227 holds data that indicates authentication credentials for the entity indicated in field 212 to access the service indicated in field 221 using the alias in field 223. For example, in some embodiments, the credentials 227 include a user name that is the same or different from the alias in field 223 and a password. In the illustrated embodiments, the credentials field 227 is empty, or omitted, unless the entity indicated in the entity ID field 212 is a subscriber to service 120. If the entity is a contact discovered from a subscriber, the entity might not be subscriber and the entity's credentials are not known. In the example embodiment, Alice is a subscriber to service 120, and the credentials field 227 holds data that indicates her password at service 110a. The credentials field 227 is an example means of achieving the advantage of allowing the contact merging service 120 to access information at the network services 110.

The contacts field 229 holds data that indicates the contacts in the user profile for the alias indicated in field 223 at the service indicated in field 221. As described in more detail below, the service 120 uses the credentials in field 227 to obtain the contacts that are stored in field 229. In the illustrated embodiments, the contacts field 229 is empty, or omitted, unless the entity indicated in the entity ID field 212 is a subscriber to service 120. If the entity is a contact discovered from a subscribed user, the entity might not be a subscribed user and the entity's credentials and contacts are not known. In the example embodiment, Alice is a subscriber to service 120, and the contacts field 227 holds data that indicates her contacts at service 110a, such as (ROBERTFLIES123, CHUCKIETOO, DAVIDDANCING, etc.). The contacts field 229 is an example means of achieving the advantage of allowing the contact merging service 120 to aggregate the contacts of all subscribed users.

As described in more detail below with reference to FIG. 4A, an entity entry 210 is included in entity aliases 200 for each entity discovered. If any of contacts in field 229 use an alias that is not already in some field 223 of some entity entry 210, then a new entity ID is generated (for an entity which is not a subscriber to service 120) and a new entity entry 210 is added to the data structure 200. Data indicating the contact ID is placed in alias field 223, and data indicating OTHER is placed in field 225. Such a non-subscribing entity will have an empty or omitted credential field 227 and an empty or omitted contacts field 229. For purposes of illustration, it is assumed that ROBERTFLIES234 is not already in any alias field 223; so a new entity ID=2002 is established for this user and a service field 220 is generated with SERVICEA indicated in field 221 and ROBERFLIES234 in field 223, OTHER in field 22, and fields 227 and 229 empty or omitted. In some embodiments in which the source field 225 also holds data that indicates which other user added the alias to the entity entry 210, the source field 225 also indicates entity ID 1001 (or, in some embodiments, the identifier in the same service, e.g., ALICE123).

The multiservice contacts field 230 holds data that indicates candidate linkages among the contact identifiers that the entity indicated in field 212 is allowed to see. In some embodiments, e.g., in some embodiments without privacy filters, field 230 is omitted. In the illustrated embodiment, there is a multiservice contacts field 230 for each entity who is a contact of the entity indicated in field 212, as indicated by the ellipsis. Each multiservice contacts field 230 includes alias field 232a, 232, and service identifier (ID) field 234a, 234b and flag field 236a, 236b for each alias of the entity, as indicated by ellipsis, (collectively referenced hereinafter as alias fields 232, service ID fields 234 and flag fields 236, respectively).

The alias field holds data that indicates the contact identifier for the entity on one of the services. For example, alias field 232a holds data that indicates ROBERTFLIES234. The service ID field 234 holds data that indicates the corresponding service. For example, service ID 234a indicates SERVICEA.

The flag field 236 holds privacy filter data that indicates whether the user indicated in field 212 is allowed to see the alias indicated in field 232, and if so, whether the source of the association can be revealed. For example, the flag field 236 holds one of four values, an ALLOWED value indicates that the entity in field 212 is allowed to see the alias and the source of the alias, a NOSOURCE value indicates that the entity in field 212 is allowed to see the alias but not the source, a PENDING value indicates that the release of the alias to the entity in field 212 is awaiting approval from the entity indicated in field 232, and a DISALLOWED value indicates that the alias may not be released to the user indicated in field 212. The flag field 236 is an example means of achieving the advantage of enforcing a privacy policy before releasing multiple aliases of a contact. In some embodiments, the service field 220 holds a field similar to the flag field that indicates the privacy flags for each of the other subscribing users; and multiservice contacts fields 230 are omitted.

The entity aliases data structure 200 is an example means to achieve the advantage of aggregating contacts from multiple users subscribing to the service and passing information gleaned by one subscribed user to other subscribed users of the service 120.

FIG. 2B is a diagram of a data structure 250 for parameters of a matching model, according to one embodiment. The matching model is also called a similarity model herein, and is used to automatically determine candidate contact identifiers to consider as aliases for the same entity. The matching model parameters data structure 250 is stored for example by the contact merging service 120, such as in the contact merging data store 124 along with the entity aliases data structure 200. For each parameter of the model there is a parameter entry field 260, with other parameters indicated by ellipsis.

Each parameter entry field 260 includes a similarity parameter field 262 and one or more threshold value fields 264a, 264b, or more indicated by ellipsis (collectively referenced hereinafter as threshold value field 264). Each threshold value field 264 is associated with a user disagree field 266a, 266b, or more indicated by ellipsis, respectively (collectively referenced hereinafter as user disagree field 266). In the illustrated embodiment, each threshold value field 264 is also associated with a user agree field 268a, 268b, or more indicated by ellipsis, respectively (collectively referenced hereinafter as user agree field 268). In some embodiments, one of set of either user disagree fields 266 or user agree fields 268 are omitted.

The similarity parameter field 262 holds data that indicates a similarity measure, such as a string similarity measure that indicates how similar two text strings are, an image similarity measure, a network similarity measure, or any other measures of similarity between two sets of data, including vector distance measures, goodness of fit, etc. The threshold value field 264 holds data that indicates a threshold value for the similarity measure indicated in field 262, such that when similarity exceeds the threshold, the model finds a probability of a match between a known alias of an entity and a candidate contact identifier. The user disagree field 266 or user agree field 268 holds data that indicates how often users presented with the candidate matches disagree or agree, respectively, with the model candidates. For example, in some embodiments, the user disagree field 266 holds data that indicates an average percent of candidate matches that a user determines are not a match. Similarly, in some embodiments, the user agree field 268 holds data that indicates an average percent of candidate matches that a user determines are a match, i.e., belong to the same entity. By tracking the user agreement or disagreement at different values of the threshold, an optimum threshold can be selected that provides candidate contact identifiers most likely to be accepted by users.

The matching model parameters data structure 250 is an example means to achieve the advantage of adapting a matching model to learn the best thresholds for various similarity measures based on user responses. In some embodiments, the thresholds are predetermined; and, the matching model parameters data structure 250 is omitted. In some embodiments, no matching model is used, and matching model parameters data structure 250 is omitted.

FIG. 3 is a time-sequence diagram 300 of messages exchanged with a contact merging service for linking multiple contact identifiers of an individual, according to an embodiment. In time sequence diagrams, time increases downward (not to scale), an individual network process is represented by vertically elongated boxes labeled by rectangles at the top. A message sent from one process to another is indicated by a horizontal arrow pointing from the sending process to the receiving process. A step at a single process is indicated by a segmented arrow looping back on the process at a vertical position indicative of the relative time when the step occurs. The processes represented in FIG. 3 include contact merging clients 127a through 127m (represented by the first and last client of the set of M users), contact merging service 120, and network services 110a through 110n (represented by the first and last services of the set of N services).

Figure 6A:
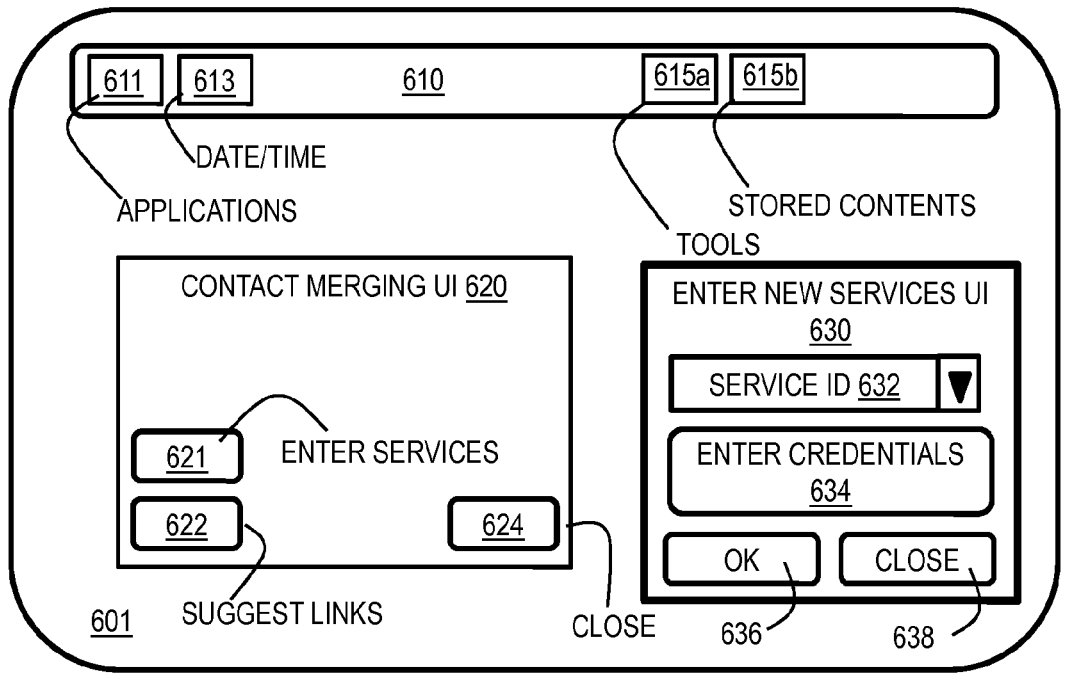
FIGS. 6A-6D are diagrams of user interfaces utilized in the processes of FIG. 5, according to various embodiments.

In one or more messages 311a, the credentials for a user of UE 101a, called User A hereinafter, for up to N services are sent. The credentials may be obtained by the client on UE 101a in any manner, such as by presenting a prompt within a user interface (UI), e.g., as described below with reference to FIG. 6A, by client 127 or through browser 107 or application client 117. Similarly, in one or more messages 311b the credentials for a user of UE 101m, called User M hereinafter, for up to N services are sent. Messages 311a and 311b and others sent by clients indicated by ellipsis are collective referenced hereinafter as credentials messages 311 and contain fields that indicate the service and the user credentials, such as user name and password, as depicted in FIG. 6A, described below.

This data is stored by the contact merging service 120, e.g., in entity aliases data structure 200. For example, in one entity entry field 210, the entity ID field 212 holds data that indicates User A followed by N service fields 220. The first service field 220 indicates SERVICEA in field 221, the User A user name in field 223, SELF in source field 225, user credentials for service 110a in field 227. At this time the contacts field 229 is empty. Similarly, in the Nth service field 220, the service field 220 indicates SERVICEN in field 221, the User A user name for this service in field 223, SELF in source field 225, and user credentials for service 110n in field 227. Corresponding entity entry fields 210 are produced and stored for each of other subscribed user through User M. It is assumed for purposes of illustration that M users subscribe to service 120, but that many more contacts of the M users are not subscribers to service 120.

In one or more messages 321a, the credentials for User A though User M at service 110a are used by the service 120 to sign onto service 110a. Similarly, in one or more messages 321b the credentials for User A though User M at service 110n are used by the service 120 to sign onto service 110n. Messages 321a and 321b and others to services indicated by ellipsis are collective referenced hereinafter as sign in messages 321 and contain fields that indicate the user credentials, such as user name and password, for the corresponding service.

In one or more messages 323a, the contacts for User A though User M are received by the service 120 from service 110a. Similarly, in one or more messages 323b, the contacts for User A though User M are received by the service 120 from service 110n. Messages 323a and 323b and others from services indicated by ellipsis are collective referenced hereinafter as service contact messages 323.

This data is stored by the contact merging service 120, e.g., in entity aliases data structure 200. For example, in one entity entry field 210, contacts field 229 in service field 220 holds data that indicates the contacts of User A at service 110a. Similarly, in the Nth service field 220, the contacts field 229 holds data that indicates the contacts of User A at service 110n. Corresponding entity entry fields 210 are produced and stored for each subscribed user through User M. For each contact who is not a subscribed user of service 120, there is not already any alias field 223 that contains the contact identifier, so an entity ID field is generated for that contact and an entity entry field 210 is added to the entity aliases data structure 200. The service ID field 221 holds data that indicates the service where the contact ID is a contact, the alias field 223 holds the contact identifier and the source field 225 holds OTHER (or READER) and, in some embodiments, the alias or entity IDs of the subscribed users who have the contact identifier in their contacts list. The credentials field 227 and contacts field 229 for the contact who is not (or not yet) a subscriber are empty.

In one or more messages 325a, the contacts for User A for up to N services are sent from the contacts matching service 120 to the client 127a of User A on UE 101a. Similarly, in one or more messages 325b the contacts for User M for up to N services are sent from the contacts matching service 120 to the client 127m of User M on UE 101m. Messages 325a and 325b and others sent to clients indicated by ellipsis are collective referenced hereinafter as client contact messages 325 and contain fields that indicate the service and the contact identifiers.

In some embodiments with a matching model, during process 330 the contacts from different services are analyzed to determine which are likely to be the same. Any method may be used to do the matching. For example, in some embodiments, data associated with each contact identifier for an entity that is not a subscribed user in a first service is compared to data associated with the contact identifiers for contacts who are not subscribed users in a second service. In some embodiments, string matching is used to compare the contact identifiers themselves. For example, JohnD in service 110a and JohnDoe in service 110m share a string of five characters and therefore are candidate aliases for the same entity. In some embodiments, semantic concepts are used rather than string matching. For example, using semantic concepts "robert" and "Bob" are synonyms for the same name "Robert." Similarly "Fly" and "flies" represent the same semantic concept of moving through the air (or an insect that does so). Thus the contact identifiers ROBERT-FLIES234 in service 110a and FLYBOB789 in service 110n both have the same two semantic concepts and therefore are similar enough to be candidate aliases of the same entity.

In some embodiments other data associated with each contact is compared. For example, communications initiated by the contacts in different services are compared. If string matching or semantic concepts show a high degree of similarity, then the two contact identifiers associated with those communications are candidate aliases of the same entity. In some embodiments, posted images can be compared using several methods, such as cross correlation, two dimensional Fourier analysis, wavelet analysis and other processes well known in image processing. If the similarity of the posted images is high enough, then the associated contact identifiers are candidate aliases for the same entity. In some embodiments public profile data for the two contacts are compared, e.g., similar age, regions, music tastes or other user profile properties publicized through the service is used to determine candidate aliases for the same entity. In some embodiments contact networks in multiple services are compared, as described in more detail below with reference to FIG. 4C. When a candidate alias is found, a service record 220 is added to the entity entry field 210 for the entity. The Source field 225 of the added service field 220 indicates MODEL (or STRING, CONTACT or RELATIONS) with a confidence related to the probability of being correct, e.g., 60%.

In some embodiments, process 330 does not begin unless one of the clients 127 sends a message indicating a service and a target contact identifier for whom to find multiple aliases among other services. In some embodiments, the matching model is implemented in the user client 127, which then performs process 330 for the contacts of one user on multiple services. In some of these embodiments, contact merging service 120 is omitted. In some embodiments, a matching model is not used, and process 330 is omitted.

In one or more messages 341a user, e.g., User M, sends data to the contact merging service 120 that indicates contact identifiers in two or more services are linked, e.g., are aliases of the same person who is not User M. For example, contact A1 in service 110a and B1 in service B and C1 in service C are aliases for the same person, e.g., User B, as determined by the reader, User M. In response, the entity aliases data structure is updated to reflect this information. For example, the entity entry fields 210 of the three contacts are combined, two entity IDs are returned to a pool of available entity IDs or labeled candidates to be merged, and the service fields 220 of these entity entry fields 210 are moved to the entity entry field 210 of the retained entity ID as a second and third service field 220. The source field 225 of the second and third service fields 220 now indicate OTHER and User M with some confidence level (e.g., MEDIUM). In some embodiments, if User M is associated with low quality information, then the entity entries 210 for the other contacts IDs, e.g., B1 and C1, are not removed; and the confidence indicated in the source field 225 is not so high, e.g., is given a LOW value. If two different readers agree, then the confidence level can be increased (e.g., from MEDIUM to HIGH).

In process 343 a privacy policy is applied to the links from User M. For example, in some embodiments, the aliases of the retained entity entry record is then associated with all three services in a multiservice contacts field 230 added to each entity entry field 210 where one of the aliases appears in the contacts field 229 of the corresponding service field 220. For example, a multiservice contacts field 230 is entered in the entity entry 210 for User M and also for one or more other users, e.g., User A, who include contact identifiers A1 or B1 or C1 in their contacts fields 229 for the corresponding services 110a, 110b or 110c, respectively. The multiservice contacts field 230 indicates the services for User B and for each service a flag that indicates the result of the privacy filter. For example, for User M, the flag indicates the alias is allowed and the source, User M, can be revealed. For User A, the flag indicates the alias is not allowed, or approval is pending, or allowed without indicating the source, or allowed with the source, as determined by the privacy policy.

In one or more message 351, the candidate linkages, e.g., data indicating an association among contact identifiers (or a subset that passes the privacy filter) that are candidate aliases, are sent to the client 127a of User A, a different subscribed user. In some embodiments, the one or more messages 351 are sent in response to a request for suggestions from the client 127a. For example, in response to a prompt in a user interface (as described in more detail below with reference to FIG. 6C), the user indicates a desire for aliases for target contact A1 in service 110a, and this is included in a suggestion request message to contact merging service 120. In some of these embodiments, matching model process 330 or privacy filter process 343, or both, are initiated on demand upon receipt of such a request for suggestions.

In one or more messages 355, data that indicates approved aliases is sent from the client 127a to the contact merging service 120. In process 360 the analysis parameters used by the matching model are updated, based on the approved aliases, and the remaining aliases which are inferred to be not approved. For example, the percentage of disagreement and agreement in fields 266 and 268, respectively, are updated for the current threshold value in one of fields 264 for each of the parameter entry fields 260. Process 360 is an example means of achieving the advantage of converging on a matching model that gives optimum suggestions for candidate contact identifiers that are potential aliases for a single entity.

In one or more messages 357, data indicating contact identifiers determined by User A to be aliases of the same entity are sent from client 127a to the contact merging service 120. Messages 357 from client 127a are analogous to messages 341 sent by client 127m. In one or more messages 361, the candidate links provided by User A, and any determined by the updated matching model, are sent from the contact merging service 120 to the client 127m of User M. Messages 361 are analogous to messages 351 sent to client 127a of User A.

Thus, contact alias knowledge of one reader is passed to other readers.

Figure 7:
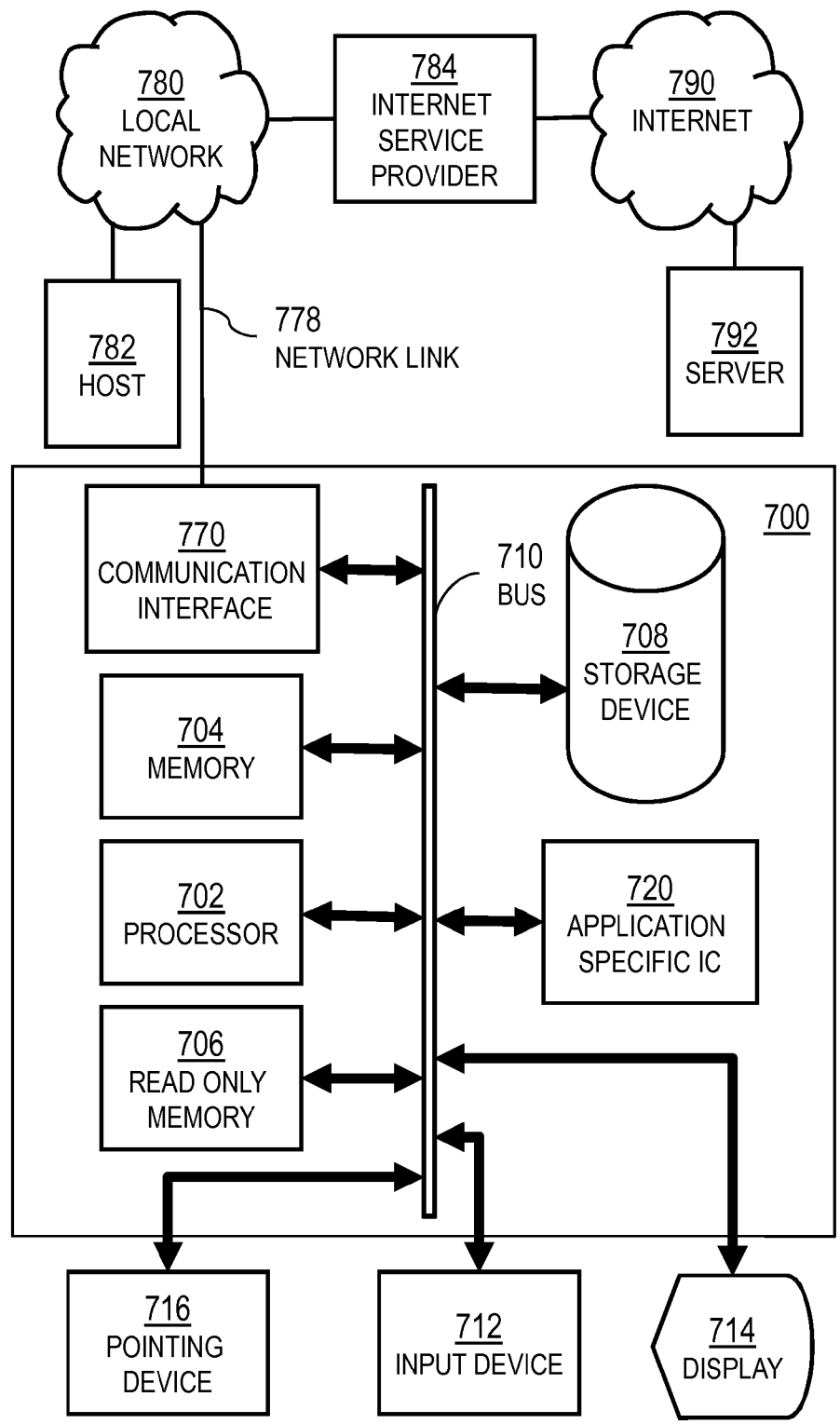
FIG. 7 is a diagram of hardware that can be used to implement an embodiment of the invention.
Figure 8:
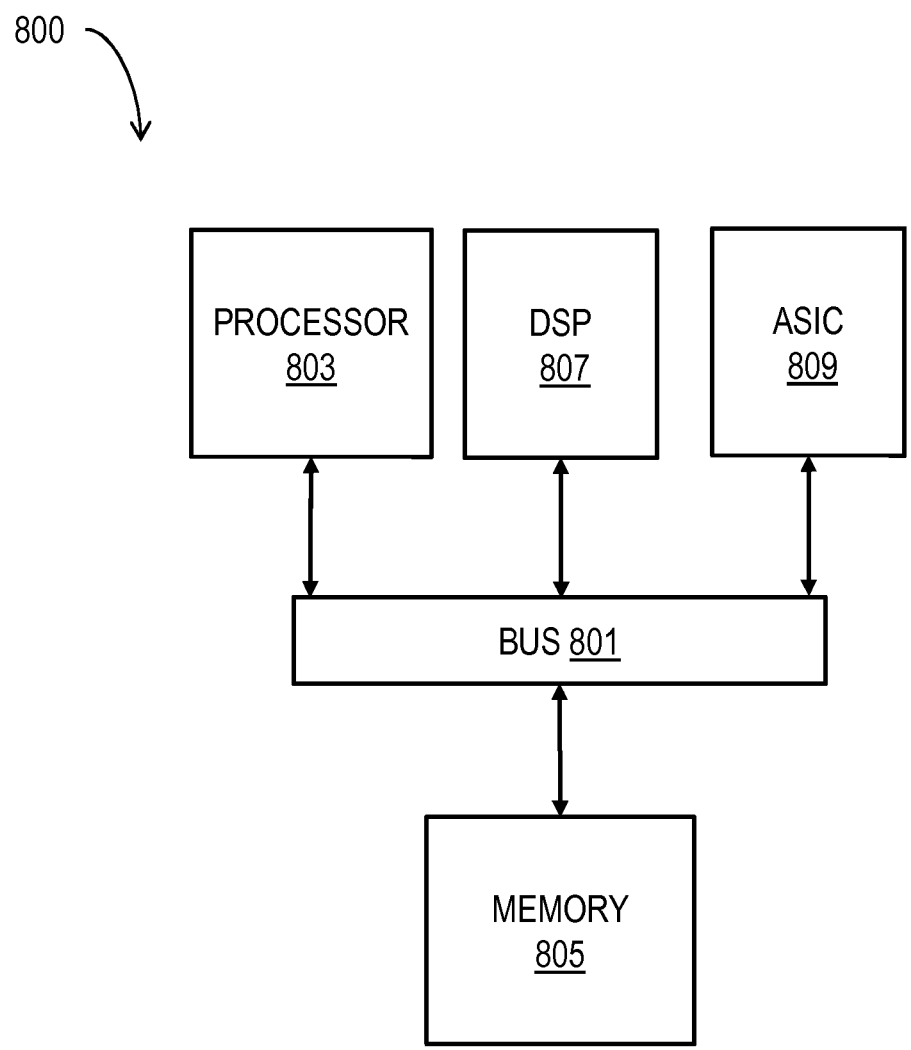
FIG. 8 is a diagram of a chip set that can be used to implement an embodiment of the invention.

FIG. 4A is a flow chart of a process at a contact merging service, according to an embodiment. In one embodiment, the contact merging service 120 performs the process 400 and is implemented in, for instance, a chip set including a processor and a memory as shown in FIG. 8 or general purpose computer system as depicted in FIG. 7. In some embodiments, one or more steps are performed on client 127. Although steps are shown in FIG. 4A, and subsequent flow charts in FIG. 4B and FIG. 5, as integral blocks in a particular order for purposes of illustration, in other embodiments, one or more steps or portions thereof are performed in a different order, or overlapping in time, in series or parallel, or are omitted, or one or more additional steps are added, or the process is changed in some combination of ways.

In step 401, contacts of a subscribed user at multiple services are determined. For example, the client 127 prompts the user for one or more contacts on the different services, or sniffs the communications between the application clients 117 and the network services 110 to ascertain those contacts. Then the client 127 sends the contacts in one or more messages to the contact merging service 120, where they are received during step 401. In some embodiments, the service 120 prompts the user to enter contacts using one or more Web pages presented through the browser 107. In the following, the interactions with the user are described as if the client 127 is involved. However, in some embodiments, the interactions with the user of UE 101 are through the browser 107. Thus step 401 includes receiving first data that indicates a plurality of contacts of a first user at a first plurality of services.

In the illustrated embodiment, step 401 includes steps 403 and 405. The contact merging client 127 prompts the user to enter one or more sets of user credentials for one or more services, and those credentials are sent to the contact merging service 120 in one or more message 311; and received during step 403. In step 405, the service 120 logs into the multiple services using those credentials and queries those services for the contacts of the subscribed user in each of the multiple services, e.g., in at least one message 321 to each of the multiple services. Step 405 includes receiving messages 323 of contacts from each service. Thus, receiving first data in step 401 further comprises receiving first data that indicates a plurality of user credentials for the first user to access the corresponding first plurality of services in step 403; and determining the plurality of contacts of the first user at the first plurality of services based on the user credentials in step 405.

In step 411, a target contact, also called a target, is determined among the contacts of the subscribed user. Any method may be used to determine the target. In some embodiments, the target is selected as the next non-subscribed user among the subscribed user's contacts. In some embodiments, step 411 includes receiving a message from the subscribed user, e.g., from client 127 on the user's UE 101, indicating one or more of the contacts to select as a target, e.g., a message is received which indicates a target for whom candidate aliases on multiple services are desired. In some embodiments, step 411 includes sending to the user's UE 101, e.g., through browser 107 or client 127, a user interface (UI) that prompts the user to select the target contact, such as UI depicted in FIG. 6B and described below.

Step 411 then includes receiving the selected target contact in a message in response to the prompt. For purposes of illustration, it is assumed that the subscribed user is Alice and her target contact is ROBERTFLIES234 in service 110a, which refers to her friend Bob.

In step 413 candidate contact identifiers associated with the target contact are determined. In some embodiments, the candidate contact identifiers are determined by a matching model that analyzes the similarity of data associated with the target contact and data associated with each of the other contacts in the entity aliases data structure. In some embodiments, the candidate contact identifiers are determined based on linkages provided by other subscribed users of the contacts matching service 120. The contact merging data store 124 is updated during step 413. In some embodiments, the candidates are filtered during step 413 by a privacy filter to avoid including candidates that the subscribed user is not entitled to see. FIG. 4B, described in more detail below, depicts a process for step 413, according to an embodiment. If there is no information to limit the candidates, then all the subscribed user's contacts are included among the candidates. Thus, in some embodiments, the plurality of candidate contact identifiers includes the contacts of the first user at the first plurality of services.

For purposes of illustration it is assumed that the candidate contacts determined during step 413 include those listed in Table 1. For simplicity the source is indicated by the subscribed user's identifier in the service of the target, e.g., in service 110a. This information is available to the service in the entity entry field 210. ROBERTFLIES234 was added by Alice in an example above and the entity was given the entity ID 2002. As indicated in the source column, three subscribed users who are users of service 110a have the target in their contact lists; namely, Alice123, Dan456 and Molly789. The target is a contact of Alice. In the next six rows of the Table, six candidate contact IDs are suggested as aliases for Bob.

In step 421, it is determined whether there is another target contact for whom candidate aliases are desired. If so, then steps 411 to 415 are repeated. If not, then, in step 423, it is determined whether another subscribed user has contacts to submit. If so, then steps 401 through 415 are repeated. If not, then control passes to step 425.

In step 425, it is determined whether the subscribed user has approved an association among one or more of the candidate contact identifiers. For example, it is determined whether one or more messages 255 indicating agreement or lack thereof to one or more of the candidate contact identifiers are received. If not, then control passes to step 429 to determine if conditions are satisfied to end the process, such as shutting down the service for maintenance. If so, then process ends. If not, then control passes back to step 423 to determine if another subscribed user is ready to provide contacts.

If it is determined in step 425 that data indicating a user approval or disapproval is received, then, in step 427, the information is updated in the contact merging data store 124 including the updates to the matching model parameters data structure 250, if any. Then, in step 429 it is determined if end conditions are satisfied, as described above. Thus step 425 and 427 include receiving data that indicates an approved association among the second user and a plurality of approved contact identifiers based, at least in part, on the plurality of candidate contact identifiers and input from the first user. In some embodiments, step 427 includes determining an adjustment to the threshold similarity based, at least in part, on agreement between the plurality of approved contact identifiers and the plurality of candidate contact identifiers.

For example, if a message indicating that she approves all the candidates in Table 1 is received from Alice, e.g., from client 127a, then the service field 220 for FLYBOB789 for service 110m is added to the entity entry field 210 with the value 2002 in the entity ID field 212 as a new service field,

TABLE 1

Candidate contact identifiers for target contact

|  | Service | Contact ID (alias) | Entity ID | Source | Contact of Alice |
|---|---|---|---|---|---|
| Target | A | ROBERTFLIES234 | 2002 | ALICE123, MOLLY789, DAN456 | Yes |
| Candidate 1 | B | ROBERT DOE | 2002 | MOLLY789, MEDIUM | Yes |
| Candidate 2 | C | BOBD | 2002 | MOLLY789, DAN456M, HIGH | Yes |
| Candidate 3 | D | ROBERTD | 2002 | DAN456, MEDIUM | No |
| Candidate 4 | N | RDOE | 2023 | DAN456, MEDIUM | Yes |
| Candidate 5 | N | FLYBOB789 | 2456 | MODEL, 70% | Yes |
| Candidate 6 | N | BDOE | 2511 | MODEL, 50% | Yes |

In step 415, candidate identifiers associated with the target contact during step 413 are included in one or more messages to be sent to the user with any source information, including any indicators of confidence, as permitted by the privacy filter. In some embodiments, the one or more messages are sent during step 415. In some embodiments, one or more messages are determined but not sent until a sending conditions is satisfied. For example, a sending condition is satisfied when it is determined in step 421 that there are no more target contacts for a particular subscribed user, or when a message is received from a client 127 requesting the candidate aliases for the target. Step 415 includes determining whether such sending conditions are satisfied.

with source indicating Alice's identifier in service 110a, e.g., ALICE123. Also, the user agree field 268 is updated for the current threshold values for the similarity parameters used to determine that FLYBOB789 and BDOE are candidate. Similar changes are made for the entity entry fields 210 for the other aliases accepted by Alice. If the response from Alice does not approve BDOE, then that entity entry field 210 is not merged, and the disagree field 266 is updated for the current threshold values of the similarity model.

If end conditions are not satisfied, and in step 423 it is determined that another subscribed user (a third user) is using the service 120, then during subsequent execution of step 413, the approved aliases of a contact of the first user, are sent to the third user. For example, FLYBOB is provided as an alias of ROBERTFLIES234 to subscribed User X. In such a subsequent execution, steps 413 and 415 include determining to send, to a different third user, e.g., User X, fourth data indicating an association between the second user ROBERTFLIES234 and a set of one or more approved contact identifiers of the plurality of approved contact identifiers of the first user (e.g., ROBERT DOE ins service B, BOBD in service C, ROBERTD in service D, and both RDOE and FLYBOB789 in service N). In some of these embodiments, the source indicates the first user (e.g., ALICE123). Thus, step 415 includes indicating an identifier of the first user in the fourth data. When a privacy filter is applied during step 413, then determining to send the fourth data to the third user further comprises determining that the fourth data satisfies a privacy condition.

FIG. 4B is a flow chart of a process 450 to perform step 413 of the process of FIG. 4A, according to an embodiment. Process 450 determines candidate contact identifiers associated with the target contact, based on input from other subscribers or a matching model that analyzes similarity of data associated with the contact identifiers, or both.

In some embodiments, the data analyzed by the matching model is the contact identifier string itself. In some embodiments, the data analyzed by the matching model includes text or images or other data posted by the contact in the corresponding service. In some embodiments the data analyzed by the matching model includes the similarity of the contacts of different subscribed users. Unless the candidates are narrowed during process 450, all the user's contacts are presented as candidate contact identifiers.

In step 451, it is determined whether the target is associated with other contact identifiers in other services by a different subscribed user. For example, it is determined whether Alice's target contact ROBERTFLIES234 is linked to contact identifiers in other services by another subscribed user of the contact merging service 120, such as MOLLY789. If not, in step 459 it is determined whether a matching model is available to determine candidate contact identifiers by analyzing data associated with contact identifiers. If no model, then the process ends, with all contacts treated as candidates.

If it is determined in step 451 that the target is associated with other contact identifiers in other services, then in step 453 the source is determined to be the different subscribed user. For example, if MOLLY789 associates ROBERTFLIES with two other contact identifiers in two other services (as indicated in lines 2 and 3) then MOLLY789 is one of the sources for each of these contact identifiers. In step 455 associated data is determined. The associated data indicates a linkage between the candidate contact identifiers and the target as determined by other subscribed users who are readers of the target contact. In some embodiments, the associated data includes the source. For example, the associated data indicates the services and names and sources listed in the second and third and fifth columns, respectively, of Table 1, for the rows of the target and candidates 1 through 4.

In some embodiments, a multiservice contacts field 230 is added to the entity entry field 210 of the subscribed user who indicated the target contact. For example, a multiservice contacts field 230 is added to the entity entry field 210 for ALICE123 which has entity ID 1001 in field 212. The multiservice contacts field 230 includes the contact identifiers in column three in successive alias fields 232, and the services listed in column two in successive fields 234. The flag fields indicate whether Alice can receive the candidate contact identifiers based on the privacy policy. In some embodiments, the flag fields are all set to a value that indicates allowed with source information and then corrected based on the privacy filter, applied in step 457.

In step 457, the associated data is filtered for privacy, e.g., a privacy filter is applied. In some embodiments, the privacy filter always strips off the source information and updates the flag fields. In some embodiments, the privacy filter only strips the source information, and updates the flag fields accordingly, for particular sources. In some embodiments, the privacy filter first requests from the source whether the source information can be provided to the subscribed user (e.g., a request is sent to MOLLY789 to allow ALICE123 to see that MOLLY789 is a source of the association among ROBERTFLIES234 and ROBERT DOE and BOBD). While a response is awaited from MOLLY789, the flag field for the aliases of Bob that she is a source for are associated with the flag value for pending approval. In some embodiments, the privacy filter first requests from the contact whether the candidate contact identifier can be provided to the subscribed user (e.g., a request is sent to ROBERTFLIES234 to allow ALICE123 to see that ROBERTFLIES234 and ROBERT DOE and BOBD are aliases for Bob. While a response is awaited from ROBERTFLIES234, the flag fields for the aliases of Bob are associated with the flag value for pending approval. In some embodiments, the privacy filter disallows Alice from seeing a candidate alias of Bob, unless the candidate alias is already among her contacts. Thus, because ROBERTD in service D is not among Alice's contacts for service D, the flag for this alias is set to a value that indicates this alias may not be released to Alice. The candidate contact identifiers that pass the privacy filter are passed to the next steps to be inserted into one or more messages during step 415, along with any aliases determined by a matching model, if such a model is included. For purposes of illustration it is assumed that the associated data includes the first and second columns of Table 1 for the target, and candidates 1 through 4.

Thus, in various embodiments of step 457, when candidates approved by the first user are being provided in fourth data sent to another third user (e.g., User X), a privacy condition to be satisfied comprises one or more of the following conditions. A contact identifier in the set of approved contact identifiers for the target is already in a contact list of the third user. The second user has granted approval to send a contact identifier in the set to the third user. The first user has granted approval to send a contact identifier in the set to the third user. The fourth data does not indicate an identifier of the first user unless the first user has approved including the identifier of the first user.

If it is determined in step 459 that a matching model is available, then in step 461 the similarity of data associated with the target and data associated with each contact is determined. Contact IDs that produce the same/similar content are candidate contacts to suggest. For example, if the contact published the same picture or text containing similar keywords as the target contact, then the contact is a good candidate. For example, many users automatically TWITTER™ their FLICKR™ photos or synchronize their status messages in different services. Similarly, contact IDs that produce content with the same metadata (e.g., location, time, people nearby), are good candidate contacts to suggest. For example, two contact IDs may often produce content with the same geo-tag. An exotic language is another content clue that a contact is similar to a target contact. If the subscribed user's contacts usually use English, but the target contact uses Chinese, then those other contacts using Chinese are good candidates to suggest. Any measure may be used to express similarity, such as cross-correlation, or vector distance in multidimensional space, or deviation from a mean value, or cluster analysis. In some embodiments, the similarity of semantic concepts of the data associated with the two contacts is measured. Thus step 461 includes determining similarity of data associated with a first contact identifier in the plurality of candidate contact identifiers to data associated with a second contact identifier among the contacts of the first user at the first plurality of services. In various embodiments of step 461, the data associated with the first contact identifier and the data associated with the second contact identifier is data that indicates one or more of the corresponding contact identifier, content posted by the corresponding contact identifier to the corresponding service, or contacts of the corresponding contact identifier in the corresponding service.

In step 463, it is determined if the measure of similarity exceeds some threshold (or, equivalently, if a measure of distance or dissimilarity is less than a threshold), then the contact is considered a candidate contact identifier for the same entity as the target contact. In some embodiments, the threshold or thresholds are predetermined. In some embodiments, the threshold is adjusted based on observed tendency of users to accept the candidate contacts suggested by the matching model. If the similarity exceeds the threshold, then the contact is added to the candidate identifiers for the target contact. Thus step 463 comprises including the second contact identifier in the plurality of candidate contact identifiers if the similarity is greater than a threshold similarity.

In step 467, it is determined if there is another contact to compare to the target. If so, control passes back to step 461 to determine the similarity of the next contact to the target. If not, the list of candidates is complete and the similarity model, e.g., the matching model, is indicated as the source. Then process 450 ends, passing control to step 415 in FIG. 4A.

For purposes of illustration, it is assumed that there is no restriction in the privacy filter that a candidate contact already be a contact of the subscribed user; and all the contact identifiers in Table 1, and the corresponding services and sources, are provided as associated data with candidate contacts to the subscribed user.

Figure 4C:
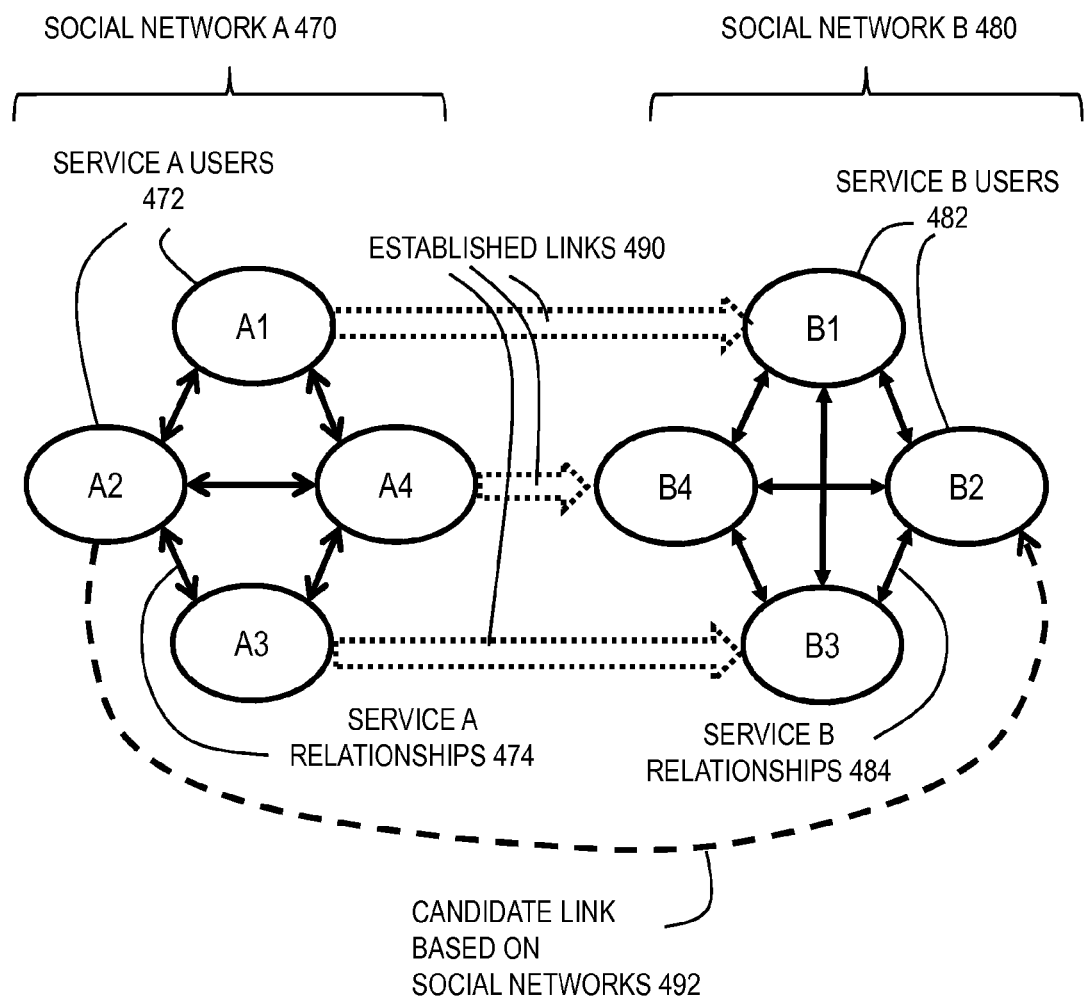
FIG. 4C is a diagram that illustrates linking identifiers based on social network connections, according to an embodiment.

In some embodiments, the similarity of social connections (RELATIONS) is used to suggest candidate. FIG. 4C is a diagram that illustrates linking identifiers based on social network connections, according to an embodiment. Service A 470 includes service users A1, A2, A3 and A4, collectively referenced as service A users 472, who are on at least some of each other's contact lists, as indicated by arrows representing service A relationships 474. Similarly, Service B 480 includes service users B1, B2, B3 and B4, collectively referenced as service B users 482, who are on at least some of each other's contact lists, as indicated by arrows representing service B relationships 484. It is assumed for purposes of illustration that it has been determined that user A1 is the same entity as user B1, i.e., A1 and B1 are linked, and, similarly, it has been determined that A4 and B4 are linked, and A3 and B3 are linked, as indicated by the dotted arrows of established links 490. Then, because the relationships of A2 to A1, A4 and A3 and A1 to A4 and A4 to A3 are similar to corresponding links with B2 in social network B 480, it is determined that user A2 is likely the same as user B2, as indicted by the dashed arrow 492 representing candidate linkage of A2 to B2 based on the social networks.

Thus the matching model in steps 461, 463 and 465 determines linkages based on similarity of strings, content, or relations. The solutions accommodate various layers of user privacy. Linkages are based on text similarity, e.g. "ABCD" and "ABC1." Linkages are based on similarity in semantics, e.g. "燕青" and "Yanqing"; one and yksi. Linkages are based on social collaborations, e.g., when person 1 links ID2 and ID3 as the same entity, representing person 2, those who also have the ID2 and ID3 in their system will be suggested to combine the ID's as one person. The same rule can also be expanded to subscribed users who have similar but not exactly the same contact IDs (e.g., have ID2 but not ID3). Linkages are based on content analysis, e.g., suggest to link contact IDs that produce the same/similar content, such as posting the same picture, or text containing similar keywords, in different social networks (with different ID). Linkages are based on content with the same metadata, e.g., location, time, people nearby, content generated by same device. Linkages are based on context analysis, e.g., suggest to link IDs that produce content in the same rare language among a user's contacts, e.g. Chinese. Linkages are based on social networking analysis, e.g., suggest to link contact IDs that have many contacts in common, or suggest to link contact IDs that co-locate with or connect to the same contacts.

The interactions with a user are controlled by a client process 127, in at least some embodiments. FIG. 5 is a flowchart of a process 500 at a contact merging client for linking multiple contact identifiers of an individual, according to one embodiment. In one embodiment, the contact merging client 127 performs the process 500 and is implemented in, for instance, a chip set including a processor and a memory as shown in FIG. 8 or mobile terminal as depicted in FIG. 9.

In step 501, it is determined to send first data that indicates user contacts. For example, a prompt is presented to a user to enter one or more contacts on each of one or more services 110 and these contacts are placed in one or more messages to send to the contact merging service 120. Alternatively, interactions between application clients 117 and services 110 are snooped to determine one or more contacts on each of one or more services; and these contacts are placed in one or more messages to send to the contact merging service 120. Thus, step 501 includes determining to send first data that indicates a plurality of contacts of a first user at a first plurality of services.

In an illustrated embodiment, step 501 includes steps 503, 505 and 507. In step 503 a prompt is presented in a user interface (UI) for a user to enter user credentials at each of one or more network services 110. For example, an enter new services user interface (UI) is presented to the user. Thus, step 503 includes determining to present, to the first user, a prompt to enter a plurality of user credentials for the first user to access the first plurality of services.

FIGS. 6A-6D are diagrams of user interfaces utilized in the processes of FIG. 5, according to various embodiments. FIG. 6A is a diagram that illustrates an example screen 601 presented at UE 101. The screen 601 includes a device toolbar 610 portion of a display, which includes zero or more active areas. As is well known, an active area is a portion of a display to which a user can point using a pointing device (such as a cursor and cursor movement device, or a touch screen) to cause an action to be initiated by the device that includes the display. Well known forms of active areas are stand alone buttons, radio buttons, pull down menus, scrolling lists, and text boxes, among others. Although areas, active areas, windows and tool bars are depicted in FIG. 6A through FIG. 6D as integral blocks in a particular arrangement on particular screens for purposes of illustration, in other embodiments, one or more screens, windows or active areas, or portions thereof, are arranged in a different order, are of different types, or one or more are omitted, or additional areas are included or the user interfaces are changed in some combination of ways.

For purposes of illustration, it is assumed that the device toolbar 610 includes active areas 611, 613, 615a and 615b. The active area 611 is activated by a user to display applications installed on the UE 101 which can be launched to begin executing, such as an email application or a video player or the contact merging client application. The active area 613 is activated by a user to display current context of the UE 101, such as current date and time and location and signal strength. In some embodiments, the active area 613 is a thumbnail that depicts the current time, or signal strength for a mobile terminal, or both, that expands when activated. The active area 615a is activated by a user to display tools built-in to the UE, such as camera, alarm clock, automatic dialer, contact list, GPS, and web browser. The active area 615b is activated by a user to display contents stored on the UE, such as pictures, videos, music, voice memos, etc.

The screen 601 also includes a contact merging user interface (UI) area 620 in which the data displayed is controlled by a client 127 or a browser 107. According to some embodiments, the application UI area 620 includes an ENTER SERVICES button 621, a SUGGEST LINKS button 622 and a CLOSE button 624. If the user activates the CLOSE button 624, the contact merging UI area 620 is closed.

If the user activates the ENTER SERVICES button 621, an enter new services user interface (UI) area 630 is presented. The enter new services UI area 630 includes a first active area 632, such as a pull down menu, to select a network service with contacts, such as a pull down menu listing services 110a through 110n. The enter new services UI area 630 also includes an active area 634 for entering user credentials as well as an OK button 636 and a CLOSE button 638. If the user activates the CLOSE button 638, the enter new services UI area 630 is closed. The enter credentials active area 634 includes a prompt inviting a user to enter user credentials, such as a user name and password, for the selected service indicted in area 632. When the user activates the OK button, data indicating the user credentials entered in active area 634 and the selected service indicated in active area 632 are added to one or more messages to send to the contact merging service 120. Thus enter new service UI areas 630 is an example means to achieve the advantage of allowing a user to specify just user credentials to obtain all contacts of the user at each network service 110.

Returning to FIG. 5, in step 505, user credentials for multiple network services 110 are received, e.g., in response to each activation of the OK button 636. Thus step 505 includes receiving user input that indicates the plurality of user credentials for the first user to access the first plurality of services.

In step 507 it is determined to send one or more messages with the user credentials for the multiple services to the contact merging service 120. As a result one or more messages 311 are sent to the contact merging service 120. Thus, step 507 includes determining to send first data that indicates the user input to a remote process that uses the plurality of user credentials to determine the plurality of contacts of the first user at the first plurality of services.

In step 511 contact identifiers for the user's contacts at the multiple network services are presented, e.g., in a contact merging UI area 620. In some embodiments, step 511 includes receiving the contacts in one or more messages from the contact merging service 120, e.g., in one or more messages 325.

Figure 6B:
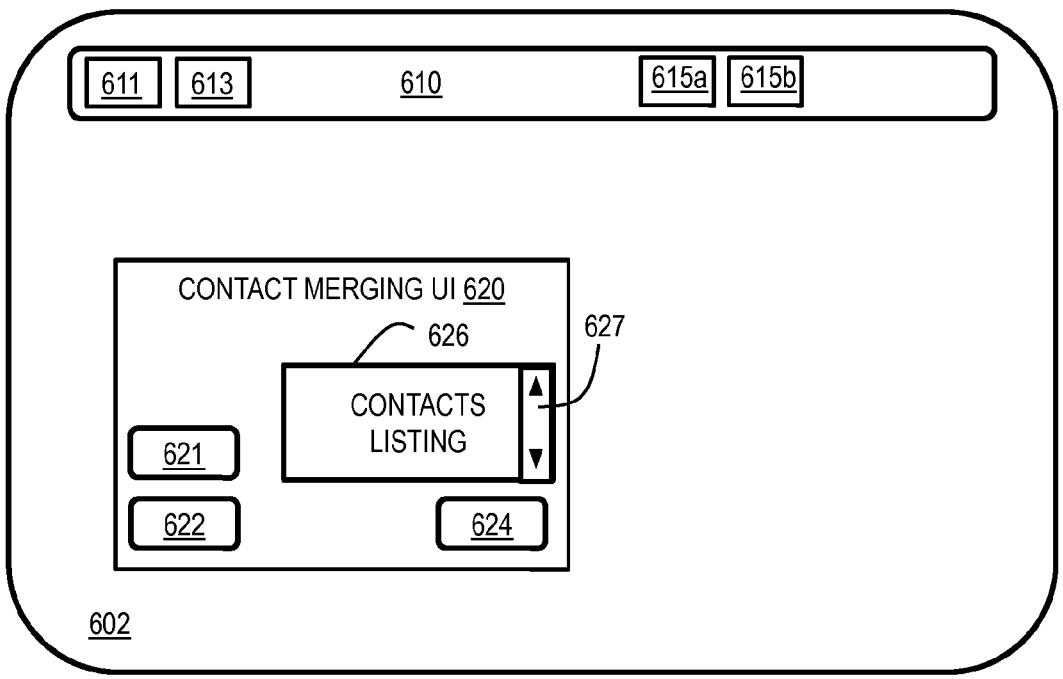

FIG. 6B is a diagram that illustrates an example screen 602 presented at UE 101 to present the user contacts after closing enter new service UI area 630. Screen 602 includes the device toolbar 610 portion, contact merging UI 620 and buttons 621, 622, 624, as described above. In screen 602, the contact merging UI area 620 includes contacts listing area 626 with a scrollbar to move into view contacts that are too numerous to display in area 626 at one time. The contacts listing area 626 presents all the contacts of the user at all network services 110 entered through UI area 630. Upon selecting one of the contacts listed in contacts listing area 626, a contact profile is presented to the user as shown in FIG. 6C.

Figure 6C:
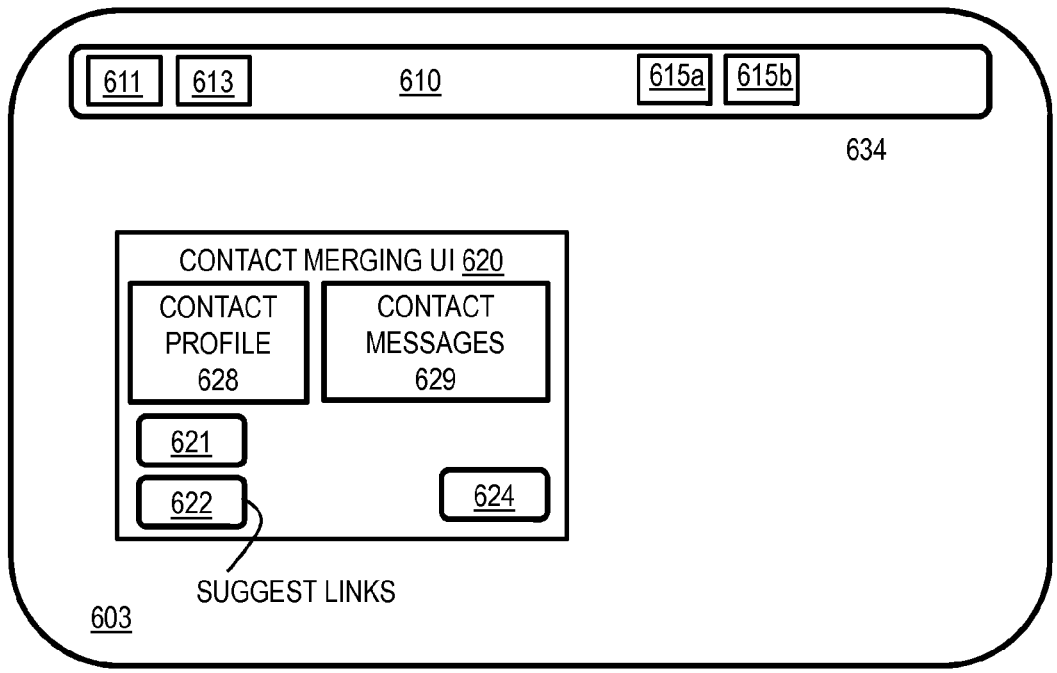

FIG. 6C is a diagram that illustrates an example screen 603 presented at UE 101 to present the profile of one of the contacts. Screen 603 includes the device toolbar 610 portion, contact merging UI 620 and buttons 621, 622, 624, as described above. In screen 603, the contact merging UI area 620 includes a contact profile area 628 and a contact messages area 629. The contact profile area 628 presents data from the contact profile at the corresponding network service 110. The contact messages area presents data posted to the network service by the contact. After the selected contact is linked to one or more other contact identifiers in corresponding other services, the contact profile area 628 presents the combined profiles, either in a merged form or in separate forms that are displayed in area 628 one or more at a time. Similarly, after the selected contact is linked to one or more other contact identifiers in one or more other services, the contact messages area 629 presents posting from all the contact identifiers on the corresponding network services 110.

Returning to FIG. 5, in step 513, it is determined to send an identifier of a target contact to the contact merging service. The target contact is one for which candidate contact identifiers that are aliases for the target are requested from the contact merging service 120. For example, upon activation of the suggest links button 622 on screen 603, the selected contact, whose profile is in area 628, is the target contact; and a request for candidate contact identifiers that are aliases for the target contact is sent to the contact merging service 120 in step 513.

In step 515, multiple candidate identifiers for the target at a corresponding multiple services are received. For example, one or more messages 351 with candidate links, such as in the second, third and fifth columns of Table 1, are received from the contact merging service 120. Thus step 515 includes receiving second data that indicates an association among a different second user and a plurality of candidate contact identifiers for the second user at a second plurality of services based at least in part on contacts of the first user at the first plurality of services.

In step 517, a prompt for approval of the candidate identifiers for the target is presented. Thus step 517 includes determining to present a prompt for the first user to approve an association between the second user and one or more of the candidate contact identifiers. In some embodiments, two or more candidates are automatically marked approved without presentation to the user. For example, when the confidence is greater than a threshold, such as 95%, called an automatic approval threshold, then step 517 is skipped for such candidates and control passes directly to step 523 that indicates approved contact identifiers for the same entity as the target contact.

Figure 6D:
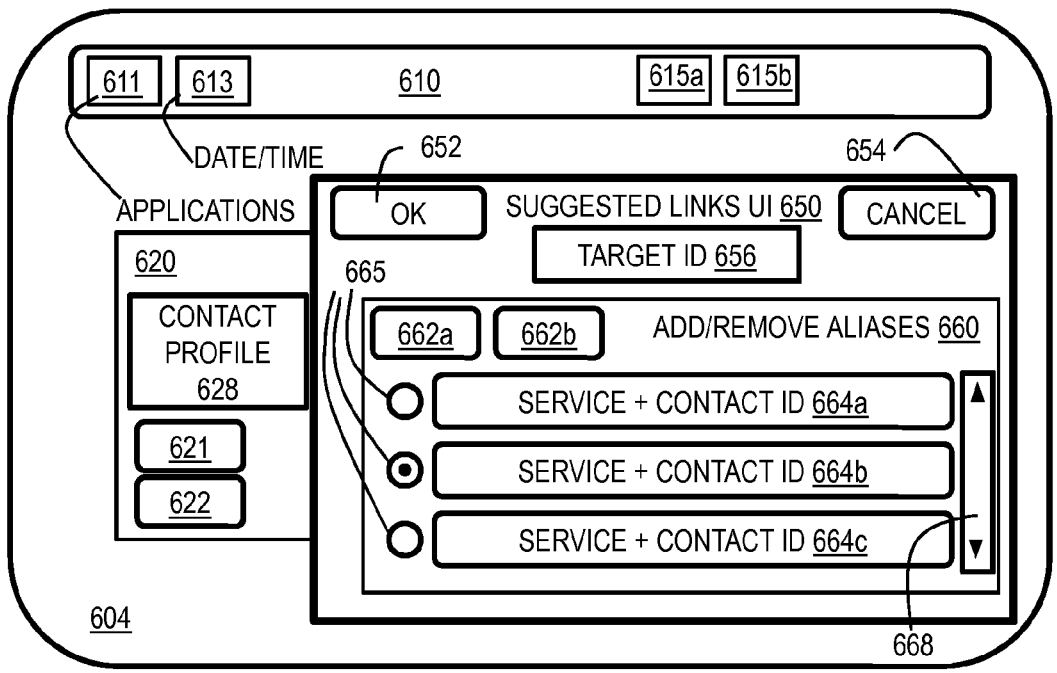

FIG. 6D is a diagram that illustrates an example screen 604 presented at UE 101 to present the suggested linkages for the target contact. Screen 604 includes the device toolbar 610 portion, and a portion of the contact merging UI 620 as described above. In screen 604, a suggested links user interface (UI) area 650 is presented. In some embodiments, the suggested links UI area 650 is presented when a linkage is determined even if the user is operating a different application at the time, e.g., even while contact merging UI area 620 is closed.

The suggested links UI area 650 includes an OK button 652, a CANCEL button 654, a target contact identifier (ID) area 656 and an add/remove aliases active area 660. The add/remove aliases active area 660 includes button 662a and button 662b, and one or more text box active areas 664a, 664b, 664c (collectively referenced hereinafter as text box active areas 664) with corresponding radio buttons 665 and a scrollbar 668 to allow any further text box active areas to be moved into view. In various embodiments, as indicated above, other active areas are used; for example, in some embodiments, check boxes are used instead of radio buttons. Each candidate contact identifier and the corresponding service are indicated in one of the text box active areas 664. In some embodiments, the source or confidence level or both are also included in each text box active area. For example, the information in the second, third and fifth columns of each row of Table 1 is presented in each text box active area 664.

The target ID area 656 indicates the target contact for which the contact identifiers in add/remove aliases active area 660 are candidates. A user's agreement, and hence approval, of a candidate contact identifier as referring to the target contact indicated in area 656 is granted by activating the radio button associated with the corresponding text box active area 664 so that the radio button is filled. Each activation of the same radio button toggles the button on (solid fill) or off (empty). In some embodiments, multiple contact IDs may be selected for the same service, e.g., to account for both a personal ID and professional ID of the same entity at the same service. Button 662a is activated to fill all the radio buttons; the button 662b is activated to toggle all the radio buttons so that filled buttons become empty and empty buttons become filled.

Upon activation of the CANCEL button 654, the suggested links UI area 650 is closed without sending the user's selections to the contact merging service, thus neither approving nor disapproving any of the candidates. Upon activation of the OK button 652, the suggested links UI area 650 is closed; and the user's selections are sent to the contact merging service 120, thus approving or disapproving each of the candidate contact IDs based on the state of the radio buttons 665.

Returning to FIG. 5, in step 521 it is determined whether user input in response to the prompt is received. If not, for example, if the CANCEL button 654 is activated, then control passes to step 529 to determine if end conditions are satisfied, e.g., whether the user closes the contact merging client 127 by activation the CLOSE button 624. If so, the process ends; otherwise steps 511 through 521 are repeated.

If it is determined in step 521 that user input is received, for example if the OK button 652 is activated, then, in step 523 data is sent that indicates approved contact identifiers for the same entity as the target contact. For example, one or more message 355 are sent from the contact merging client 127 to the contact merging service 120. These messages are used by the service 120 to update the entity aliases data structure 200 and the model threshold statistics in data structure 250. Thus, steps 521 and 523 include receiving user input that indicates an approved association among the second user and a plurality of approved contact identifiers based, at least in part, on the plurality of candidate contact identifiers; and, determining to send third data that indicates the approved association among the second user and the plurality of approved contact identifiers.

The processes described herein for linking multiple contact identifiers of an individual may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to link multiple contact identifiers of an individual as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of linking multiple contact identifiers of an individual.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to linking multiple contact identifiers of an individual. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for linking multiple contact identifiers of an individual. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for linking multiple contact identifiers of an individual, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for linking multiple contact identifiers of an individual at the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to link multiple contact identifiers of an individual as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of linking multiple contact identifiers of an individual.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to link multiple contact identifiers of an individual. The memory 805 also stores the data associated with or generated by the execution of the inventive steps.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of linking multiple contact identifiers of an individual. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of linking multiple contact identifiers of an individual. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to link multiple contact identifiers of an individual. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving first data that indicates a plurality of contacts of a first user at a first plurality of services;
   determining a plurality of candidate contact identifiers for a different second user at a second plurality of services based at least in part on contacts of the first user at the first plurality of services; and
   determining to send second data that indicates an association among the second user and the plurality of candidate contact identifiers,
   wherein the association provides an indication that one or more of the plurality of candidate contact identifiers may be the same as the second user.

2. A method of claim 1, wherein receiving first data further comprises:
   receiving first data that indicates a plurality of user credentials for the first user to access the first plurality of services; and
   determining the plurality of contacts of the first user at the first plurality of services based on the user credentials.

3. A method of claim 1, further comprising receiving third data that indicates an approved association among the second user and a plurality of approved contact identifiers based, at least in part, on the plurality of candidate contact identifiers and input from the first user,
   wherein the approved association indicates a confirmation by the first user that one or more of the plurality of candidate contact identifiers is the same as the second user.

4. A method of claim 1, wherein the plurality of candidate contact identifiers includes the contacts of the first user at the first plurality of services.

5. A method of claim 1, wherein determining the plurality of candidate contact identifiers comprises:
   determining similarity of data associated with a first contact identifier in the plurality of candidate contact identifiers to data associated with a second contact identifier among the contacts of the first user at the first plurality of services; and
   if the similarity is greater than a threshold similarity, then including the second contact identifier in the plurality of candidate contact identifiers.

6. A method of claim 5, wherein the data associated with the first contact identifier and the data associated with the second contact identifier is data that indicates one or more of the corresponding contact identifier, content posted by the corresponding contact identifier to the corresponding service, or contacts of the corresponding contact identifier in the corresponding service.

7. A method of claim 5, further comprising:
   receiving third data that indicates an approved association among the second user and a plurality of approved contact identifiers based, at least in part, on the plurality of candidate contact identifiers and input from the first user; and
   determining an adjustment to the threshold similarity based, at least in part, on agreement between the plurality of approved contact identifiers and the plurality of candidate contact identifiers.

8. A method of claim 3, further comprising determining to send, to a different third user, fourth data indicating an association between the second user and a set of one or more approved contact identifiers of the plurality of approved contact identifiers.

9. A method of claim 8, wherein the fourth data further indicates an identifier of the first user.

10. A method of claim 8, wherein determining to send the fourth data to the third user further comprises determining that the fourth data satisfies a privacy condition.

11. A method of claim 10, wherein the privacy condition comprises one or more of:
    a contact identifier in the set is already in a contact list of the third user;
    the second user has granted approval to send a contact identifier in the set to the third user;
    the first user has granted approval to send a contact identifier in the set to the third user; or
    the fourth data does not indicate an identifier of the first user unless the first user has approved including the identifier of the first user.

12. A method comprising:
    determining to send first data that indicates a plurality of contacts of a first user at a first plurality of services;
    receiving second data that indicates an association among a different second user and a plurality of candidate contact identifiers for the second user at a second plurality of services based at least in part on contacts of the first user at the first plurality of services; and
    determining to present a prompt for the first user to approve an association between the second user and one or more of the candidate contact identifiers,
    wherein the association provides an indication that the one or more of the candidate contact identifiers may be the same as the second user, and
    wherein approval by the first user of the association between the second user and the one or more of the candidate contact identifiers indicates that the first user confirms that the one or more of the candidate contact identifiers is the same as the second user.

13. A method of claim 12, wherein determining to send the first data further comprises:
    determining to present, to the first user, a prompt to enter a plurality of user credentials for the first user to access the first plurality of services;
    receiving user input that indicates the plurality of user credentials for the first user to access the first plurality of services; and
    determining to send first data that indicates the user input to a remote process that uses the plurality of user credentials to determine the plurality of contacts of the first user at the first plurality of services.

14. A method of claim 12, further comprising:
    receiving user input that indicates an approved association among the second user and a plurality of approved contact identifiers based, at least in part, on the plurality of candidate contact identifiers; and
    determining to send third data that indicates the approved association among the second user and the plurality of approved contact identifiers.

15. An apparatus comprising:
    at least one processor; and
    at least one memory including computer program code for one or more programs,
    the at least one memory and the computer program code configured to, with the at least one processor, cause the apparatus to perform at least the following,
    receive first data that indicates a plurality of contacts of a first user at a first plurality of services;
    determine a plurality of candidate contact identifiers for a different second user at a second plurality of services based at least in part on contacts of the first user at the first plurality of services; and
    determine to send second data that indicates an association among the second user and the plurality of candidate contact identifiers,
    wherein the association provides an indication that one or more of the plurality of candidate contact identifiers may be the same as the second user.

16. An apparatus of claim 15, wherein the apparatus is further caused to receive third data that indicates an approved association among the second user and a plurality of approved contact identifiers based, at least in part, on the plurality of candidate contact identifiers and input from the first user,
    wherein the approved association indicates a confirmation by the first user that one or more of the plurality of candidate contact identifiers is the same as the second user.

17. An apparatus of claim 16, wherein the apparatus is further caused to determine to send, to a different third user, fourth data indicating an association between the second user and a set of one or more approved contact identifiers of the plurality of approved contact identifiers.

18. An apparatus of claim 15, wherein to determine the plurality of candidate contact identifiers comprises to:
    determine similarity of data associated with a first contact identifier in the plurality of candidate contact identifiers to data associated with a second contact identifier among the contacts of the first user at the first plurality of services; and
    if the similarity is greater than a threshold similarity, then include the second contact identifier in the plurality of candidate contact identifiers.

19. An apparatus comprising:
    at least one processor; and
    at least one memory including computer program code for one or more programs,
    the at least one memory and the computer program code configured to, with the at least one processor, cause the apparatus to perform at least the following,
    determine to send first data that indicates a plurality of contacts of a first user at a first plurality of services;
    receive second data that indicates an association among a different second user and a plurality of candidate contact identifiers for the second user at a second plurality of services based at least in part on contacts of the first user at the first plurality of services; and
    determine to present a prompt for the first user to approve an association between the second user and one or more of the candidate contact identifiers,
    wherein the association provides an indication that the one or more of the candidate contact identifiers may be the same as the second user, and
    wherein approval by the first user of the association between the second user and the one or more of the candidate contact identifiers indicates that the first user confirms that the one or more of the candidate contact identifiers is the same as the second user.

20. An apparatus of claim 19, wherein the apparatus is a mobile phone further comprising:
    user interface circuitry and user interface software configured to facilitate user control of at least some functions of the mobile phone through use of a display and configured to respond to user input; and
    a display and display circuitry configured to display at least a portion of a user interface of the mobile phone, the display and display circuitry configured to facilitate user control of at least some functions of the mobile phone.

* * * * *